US012634193B2

(12) United States Patent
Kita

(10) Patent No.: US 12,634,193 B2
(45) Date of Patent: May 19, 2026

(54) ESTIMATION OF ROUTER THAT IS CAUSE OF SILENT FAILURES

(71) Applicant: RAKUTEN MOBILE, INC., Tokyo (JP)

(72) Inventor: Shinya Kita, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 330 days.

(21) Appl. No.: 18/574,312

(22) PCT Filed: Mar. 31, 2023

(86) PCT No.: PCT/JP2023/013540
§ 371 (c)(1),
(2) Date: Dec. 27, 2023

(87) PCT Pub. No.: WO2024/202004
PCT Pub. Date: Oct. 3, 2024

(65) Prior Publication Data
US 2025/0106096 A1 Mar. 27, 2025

(51) Int. Cl.
*H04L 41/40* (2022.01)
*H04L 41/0677* (2022.01)

(52) U.S. Cl.
CPC .......... *H04L 41/0677* (2013.01); *H04L 41/40* (2022.05)

(58) Field of Classification Search
CPC ............................ H04L 41/0677; H04L 41/40
USPC ........................................................ 370/242
See application file for complete search history.

(56) References Cited

U.S. PATENT DOCUMENTS

| | | | | |
|---|---|---|---|---|
| 12,457,165 B2 * | 10/2025 | Krishnaswamy | ....... | H04L 45/22 |
| 2019/0364431 A1 * | 11/2019 | Kodaypak | ............. | H04W 16/02 |
| 2023/0040676 A1 | 2/2023 | Kita et al. | | |

FOREIGN PATENT DOCUMENTS

| | | | | |
|---|---|---|---|---|
| WO | 2021171210 A1 | 9/2021 | | |
| WO | WO-2022182272 A1 * | 9/2022 | ............... | G06N 3/09 |

* cited by examiner

*Primary Examiner* — Christopher R Crompton
(74) *Attorney, Agent, or Firm* — HAUPTMAN HAM, LLP

(57) ABSTRACT

Provided are a router estimation system and a router estimation method which enable accurate estimation of a router that is a cause of silent failures in network slices. A policy manager (90) identifies, for each one of a plurality of slice communications held in a communication system, the number of pairs that include the slice communication and that are each linked to a degree of correlation decrease satisfying a decrease determination condition. The policy manager (90) estimates at least one router as a router that is a cause of deterioration of performance of function elements related to the slice communication, the at least one router being included in a group of routers which are identified based on router group data and which are located on a route of the slice communication for which the number of the pairs that satisfies a given pair count condition is identified.

19 Claims, 17 Drawing Sheets

| FIRST SLICE COMMUNICATION ID | FIRST FUNCTION ELEMENT ID |
|---|---|
| | FIRST SLICE ID |
| SECOND SLICE COMMUNICATION ID | SECOND FUNCTION ELEMENT ID |
| | SECOND SLICE ID |

| CORRELATION DEGREE DATA |
|---|

| DATE AND TIME DATA |
|---|

| |
|---|
| SERVER ID |
| LOCATION DATA |
| BUILDING DATA |
| FLOOR NUMBER DATA |
| RACK DATA |
| SPECIFICATION DATA |
| NETWORK DATA |
| OPERATING CONTAINER ID LIST |
| CLUSTER ID |

FIG.8

| FUNCTION ELEMENT ID | SLICE ID | SEGMENT ROUTING PATH ID LIST |
|---|---|---|
| gNB001 | 001 | 001,002,003,··· |
| gNB001 | 002 | 011,012,013,··· |
| gNB001 | 003 | 021,022,023,··· |
| gNB002 | 001 | 101,102,103,··· |
| gNB002 | 002 | 111,112,113,··· |
| gNB002 | 003 | 121,122,123,··· |
| gNB003 | 001 | 201,202,203,··· |
| gNB003 | 002 | 211,212,213,··· |
| gNB003 | 003 | 221,222,223,··· |

FIG.9

| SEGMENT ROUTING PATH ID | ROUTER ID LIST |
|---|---|
| 011 | 10000,10001,10002,・・・,20001,20002,・・・ |
| 012 | 10000,10011,10012,・・・ |
| 013 | 10000,10021,10022,・・・ |
| 101 | 11000,11001,11002,・・・ |
| 102 | 11000,11011,11012,・・・,20001,20002,・・・ |
| 103 | 11000,11021,11022,・・・ |
| 221 | 12000,12001,12002,・・・ |
| 222 | 12000,12011,12012,・・・ |
| 223 | 12000,12021,12022,・・・,20001,20003,・・・ |

FIG.10

| FIRST SLICE COMMUNICATION ID | FIRST FUNCTION ELEMENT ID |
| | FIRST SLICE ID |
| SECOND SLICE COMMUNICATION ID | SECOND FUNCTION ELEMENT ID |
| | SECOND SLICE ID |
| CORRELATION DEGREE DATA | |
| DATE AND TIME DATA | |

FIG.11

| FIRST SLICE COMMUNICATION ID | FIRST FUNCTION ELEMENT ID |
| | FIRST SLICE ID |
| SECOND SLICE COMMUNICATION ID | SECOND FUNCTION ELEMENT ID |
| | SECOND SLICE ID |
| CORRELATION DECREASE DEGREE DATA | |
| DATE AND TIME DATA | |

FIG.13

| FIRST SLICE COMMUNICATION ID | FIRST FUNCTION ELEMENT ID |
|---|---|
| | FIRST SLICE ID |
| SECOND SLICE COMMUNICATION ID | SECOND FUNCTION ELEMENT ID |
| | SECOND SLICE ID |
| CORRELATION INCREASE DEGREE DATA | |
| DATE AND TIME DATA | |

ESTIMATION OF ROUTER THAT IS CAUSE OF SILENT FAILURES

RELATED APPLICATIONS

The present application is a National Phase of International Application Number PCT/JP2023/013540, filed Mar. 31, 2023.

TECHNICAL FIELD

The present disclosure relates to estimation of a router that is a cause of silent failures.

BACKGROUND ART

In Patent Literature 1, there is described deployment of a plurality of network functions (NFs) included in a network service (NS) on a server in which a container-type application execution environment is installed. In Patent Literature 1, there are also described construction of network slices and monitoring of the NFs.

CITATION LIST

Patent Literature

[Patent Literature 1] WO 2021/171210 A1

SUMMARY OF INVENTION

Technical Problem

In a communication system as described in Patent Literature 1, there is a case in which, despite detection of no trouble in a router that is a component of the communication system, function elements (NSs, NFs, and the like) included in the communication system experience deterioration of performance (so-called silent failures) in communications that use network slices available to the function elements. A cause of such a silent failure is difficult to ascertain.

The present disclosure has been made in view of the circumstance described above, and an object of the present disclosure is to provide a router estimation system and a router estimation method which enable accurate estimation of a router in network slices that is a cause of a silent failure.

Solution to Problem

According to one embodiment of the present disclosure, there is provided a router estimation system including one or more processors, the router estimation system causing at least one of the one or more processors to execute a router group data storing process, a correlation decrease degree calculation process, a decrease determination process, a pair count identification process, and a router estimation process. In the router group data storing process, for each one of a plurality of network slices constructed in a communication system, router group data indicating a group of routers that form the each one of the plurality of network slices is stored. In the correlation decrease degree calculation process, a degree of correlation decrease is calculated, the degree of correlation decrease being linked to a pair of one slice communication which is a slice communication held by one of function elements included in the communication system with use of one of the plurality of network slices and another slice communication which is held by one of the function elements included in the communication system with use of one of the plurality of network slices and which is other than the one slice communication, the degree of correlation decrease being a degree of decrease in strength of correlation between a performance index value that indicates performance of the one of the function elements that holds the one slice communication in the one slice communication and a performance index value that indicates performance of the one of the function elements that holds the another slice communication in the another slice communication. In the decrease determination process, for each of a plurality of pairs which are each the pair of the one slice communication and the another slice communication, whether the degree of correlation decrease linked to the each of the plurality of the pairs satisfies a given decrease determination condition is determined. In the pair count identification process, for each one of a plurality of slice communications held in the communication system, the number of pairs that are each the pair of the one slice communication and the another slice communication one of which is the each one of the plurality of slice communications, and that are each linked to the degree of correlation decrease satisfying the given decrease determination condition is identified. In the router estimation process, at least one router is estimated as a router that is a cause of deterioration of performance of the function elements related to the each one of the plurality of slice communications, the at least one router being included in a group of routers which are identified based on the router group data and which are located on a route of the each one of the plurality of slice communications for which the number of the pairs that satisfies a given pair count condition is identified.

Further, according to one embodiment of the present disclosure, there is provided a router estimation method including storing, for each one of a plurality of network slices constructed in a communication system, router group data indicating a group of routers that form the each one of the plurality of network slices. The router estimation method also includes calculating a degree of correlation decrease, the degree of correlation decrease being linked to a pair of one slice communication which is a slice communication held by one of function elements included in the communication system with use of one of the plurality of network slices and another slice communication which is held by one of the function elements included in the communication system with use of one of the plurality of network slices and which is other than the one slice communication, the degree of correlation decrease being a degree of decrease in strength of correlation between a performance index value that indicates performance of the one of the function elements that holds the one slice communication in the one slice communication and a performance index value that indicates performance of the one of the function elements that holds the another slice communication in the another slice communication. The router estimation method also includes determining, for each of a plurality of pairs which are each the pair of the one slice communication and the another slice communication, whether the degree of correlation decrease linked to the each of the plurality of the pairs satisfies a given decrease determination condition. The router estimation method also includes identifying, for each one of a plurality of slice communications held in the communication system, the number of pairs that are each the pair of the one slice communication and the another slice communication one of which is the each one of the plurality of slice communications, and that are each linked to the degree of correlation decrease satisfying the given decrease determination condition. The router estimation method also includes estimating at least one router as a router that is a cause of deterioration of performance of the function elements related to the each one of the plurality of slice communications, the at least one router being included in a group of routers which are identified based on the router group data and which are located on a route of the each one of the plurality of slice communications for which the number of the pairs that satisfies a given pair count condition is identified.

BRIEF DESCRIPTION OF DRAWINGS

FIG. 3 is a diagram for schematically illustrating an example of a network service in the one embodiment of the present invention.

FIG. 6 is a diagram for illustrating an example of data structure of physical inventory data.

FIG. 8 is a table for showing an example of segment routing path management data.

FIG. 9 is a table for showing an example of router group management data.

FIG. 10 is a diagram for illustrating an example of data structure of correlation degree data.

FIG. 11 is a diagram for illustrating an example of data structure of correlation decrease degree data.

FIG. 13 is a diagram for illustrating an example of data structure of correlation increase degree data.

DESCRIPTION OF EMBODIMENTS

One embodiment of the present invention is now described in detail with reference to the drawings.

Figure 1:
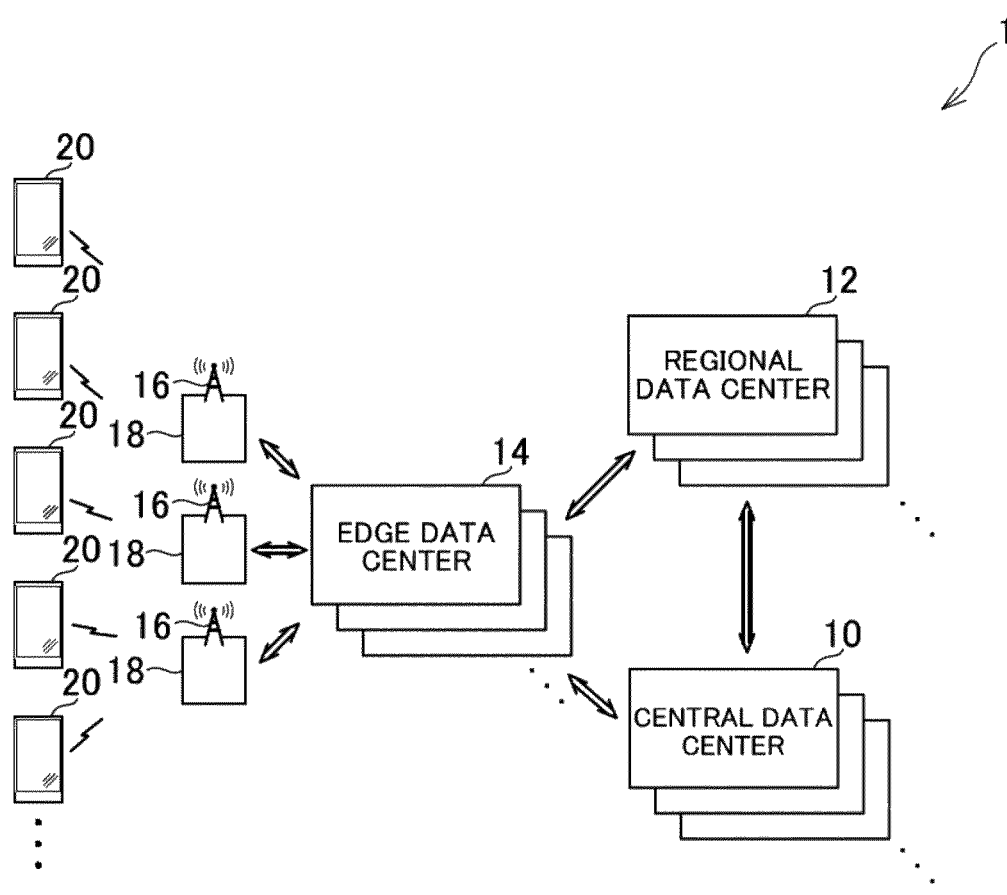
FIG. 1 is a diagram for illustrating an example of a communication system in one embodiment of the present invention.
Figure 2:
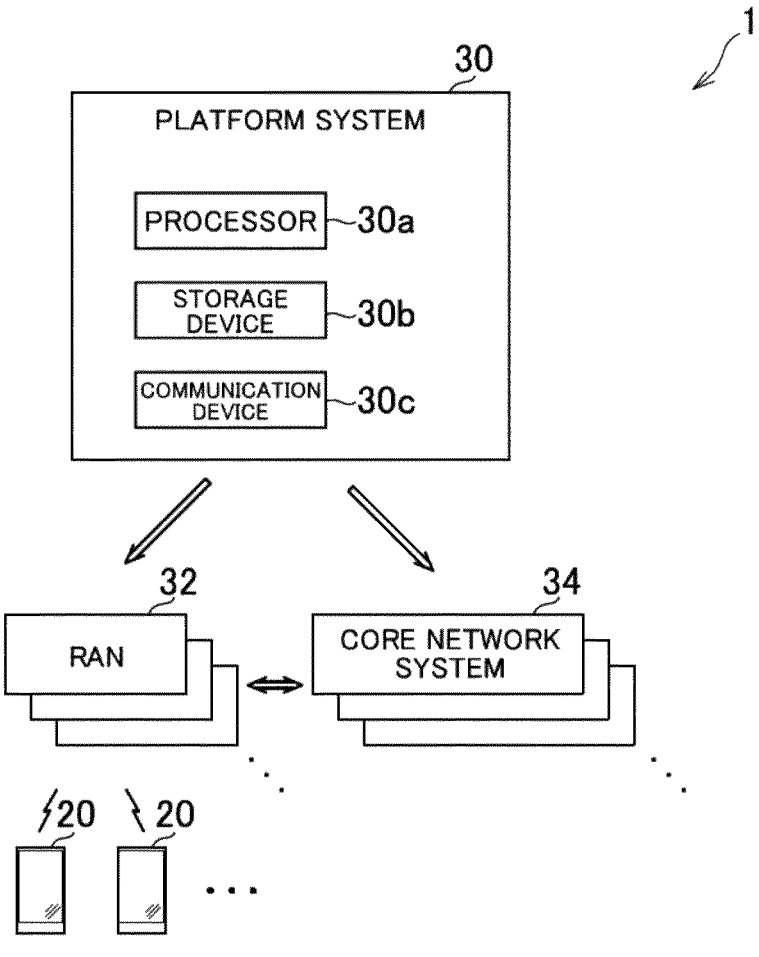
FIG. 2 is a diagram for illustrating an example of the communication system in the one embodiment of the present invention.

FIG. 1 and FIG. 2 are each a diagram for illustrating an example of a communication system 1 in the one embodiment of the present invention. FIG. 1 is an illustration drawn with attention being given to locations of a data center group included in the communication system 1. FIG. 2 is an illustration drawn with attention being given to various computer systems implemented in the data center group included in the communication system 1.

As illustrated in FIG. 1, the data center group included in the communication system 1 is classified into central data centers 10, regional data centers 12, and edge data centers 14.

For example, several central data centers 10 are dispersedly arranged in an area (for example, in Japan) covered by the communication system 1.

For example, tens of regional data centers 12 are dispersedly arranged in the area covered by the communication system 1. For example, when the area covered by the communication system 1 is the entire area of Japan, one or two regional data centers 12 may be arranged in each prefecture.

For example, thousands of edge data centers 14 are dispersedly arranged in the area covered by the communication system 1. In addition, each of the edge data centers 14 can communicate to and from a communication facility 18 provided with an antenna 16. Here, as illustrated in FIG. 1, one edge data center 14 may be capable of communicating to and from several communication facilities 18. The communication facility 18 may include a computer such as a server computer. The communication facility 18 in the present embodiment performs radio communication to and from a user equipment (UE) 20 via the antenna 16. For example, a radio unit (RU) described later is arranged in the communication facility 18 provided with the antenna 16.

A plurality of servers are arranged in each of the central data centers 10, the regional data centers 12, and the edge data centers 14 in the present embodiment.

In the present embodiment, for example, the central data centers 10, the regional data centers 12, and the edge data centers 14 can communicate to and from one another. Communication can also be performed between the central data centers 10, between the regional data centers 12, and between the edge data centers 14.

As illustrated in FIG. 2, the communication system 1 in the present embodiment includes a platform system 30, a plurality of radio access networks (RANs) 32, a plurality of core network systems 34, and a plurality of UEs 20. The core network systems 34, the RANs 32, and the UEs 20 cooperate with each other to implement a mobile communication network.

The RANs 32 are each a computer system which is provided with the antenna 16, and corresponds to an eNodeB (eNB) in a fourth generation mobile communication system (hereinafter referred to as "4G") and an NR base station (gNB) in a fifth generation mobile communication system (hereinafter referred to as "5G"). The RANS 32 in the present embodiment are implemented mainly by server groups arranged in the edge data centers 14 and the communication facilities 18. A part of the RANs 32 (for example, distributed unit (DU), central unit (CU), virtual distributed unit (vDU), or virtual central unit (vCU)) may be implemented by the central data center 10, the regional data center 12, or the communication facility 18 instead of the edge data center 14.

The core network systems 34 are each a system corresponding to an evolved packet core (EPC) in 4G or a 5G core (5GC) in 5G. The core network systems 34 in the present embodiment are implemented mainly by server groups arranged in the central data centers 10 or the regional data centers 12.

The platform system 30 in the present embodiment is configured, for example, on a cloud platform and includes a processor 30*a*, a storage device 30*b*, and a communication device 30*c*, as illustrated in FIG. 2. The processor 30*a* is a program control device such as a microprocessor which operates in accordance with a program installed in the platform system 30. The storage device 30*b* is, for example, a storage element such as a ROM or RAM, a solid state drive (SSD), a hard disk drive (HDD), or the like. The storage device 30*b* stores a program to be executed by the processor 30*a*, and the like. The communication device 30*c* is, for example, a communication interface, such as a network interface controller (NIC) or a wireless local area network (LAN) module. Software-defined networking (SDN) may be implemented in the communication device 30*c*. The communication device 30*c* exchanges data with the RAN 32 and the core network system 34.

In the present embodiment, the platform system 30 is implemented by a server group arranged in the central data center 10. The platform system 30 may be implemented by a server group arranged in the regional data center 12.

In the present embodiment, for example, in response to a purchase request for a network service (NS) by a purchaser, the network service for which the purchase request has been made is constructed in the RAN 32 or the core network system 34. Then, the constructed network service is provided to the purchaser.

For example, a network service such as a voice communication service, a data communication service, or the like, is provided to the purchaser who is a mobile virtual network operator (MVNO). The voice communication service or the data communication service provided in the present embodiment is eventually provided to a customer (end user) for the purchaser (MVNO in the above-mentioned example), who uses the UE 20 illustrated in FIG. 1 and FIG. 2. The end user can perform voice communication or data communication to and from other users via the RAN 32 or the core network system 34. The UE 20 of the end user can also access a data network such as the Internet via the RAN 32 or the core network system 34.

In addition, in the present embodiment, an Internet of things (IoT) service may be provided to an end user who uses a robot arm, a connected car, or the like. In such a case, an end user who uses, for example, a robot arm, a connected car, or the like may be a purchaser of the network service in the present embodiment.

In the present embodiment, a container-type virtualized application execution environment such as Docker (trademark) is installed in the servers arranged in the central data center 10, the regional data center 12, and the edge data center 14, and containers can be deployed in those servers and operated. In those servers, a cluster formed of one or more containers generated by such a virtualization technology may be constructed. For example, a Kubernetes cluster managed by a container management tool such as Kubernetes (trademark) may be constructed. Then, a processor on the constructed cluster may execute a container-type application.

The network service provided to the purchaser in the present embodiment is formed of one or a plurality of functional units (for example, network function (NF)). In the present embodiment, the functional unit is implemented by the NF implemented by the virtualization technology. The NE implemented by the virtualization technology is called "virtualized network function (VNF)." It does not matter what kind of virtualization technology has been used for virtualization. For example, a containerized network function (CNF) implemented by a container-type virtualization technology is also included in the VNF in the present description. The present embodiment is described on the assumption that the network service is implemented by one or a plurality of CNFs. The functional unit in the present embodiment may also correspond to a network node.

Figure 3:
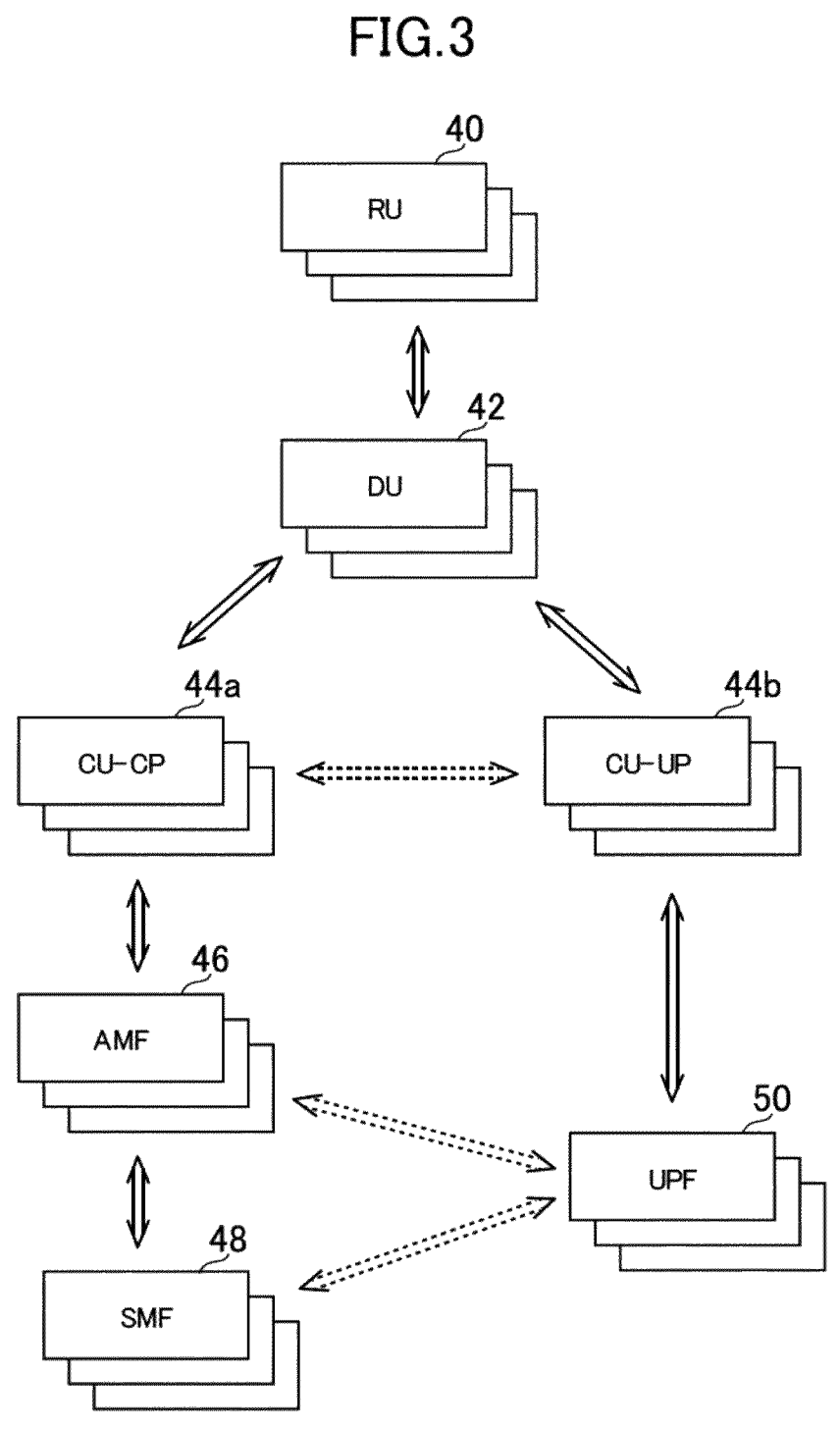

FIG. 3 is a diagram for schematically illustrating an example of an operating network service. The network service illustrated in FIG. 3 includes NFS, such as a plurality of RUs 40, a plurality of DUs 42, a plurality of CUs 44 (central unit-control planes (CU-CPs) 44*a* and central unit-user planes (CU-UPS) 44*b*), a plurality of access and mobility management functions (AMFs) 46, a plurality of session management functions (SMFs) 48, and a plurality of user plane functions (UPFs) 50, as software elements.

In the example of FIG. 3, the RU 40, the DU 42, the CU-CP 44*a*, the AMF 46, and the SME 48 correspond to elements of a control plane (C-Plane), and the RU 40, the DU 42, the CU-UP 44*b*, and the UPF 50 correspond to elements of a user plane (U-Plane).

The network service may include other types of NFs as software elements. In addition, the network service is implemented on a plurality of servers or other computer resources (hardware elements).

Then, in the present embodiment, for example, the network service illustrated in FIG. 3 provides a communication service in a certain area.

Then, in the present embodiment, it is assumed that the plurality of RUs 40, the plurality of DUs 42, the plurality of CU-UP 44*b*, and the plurality of UPFs 50, which are illustrated in FIG. 3, belong to one end-to-end network slice.

Figure 4:
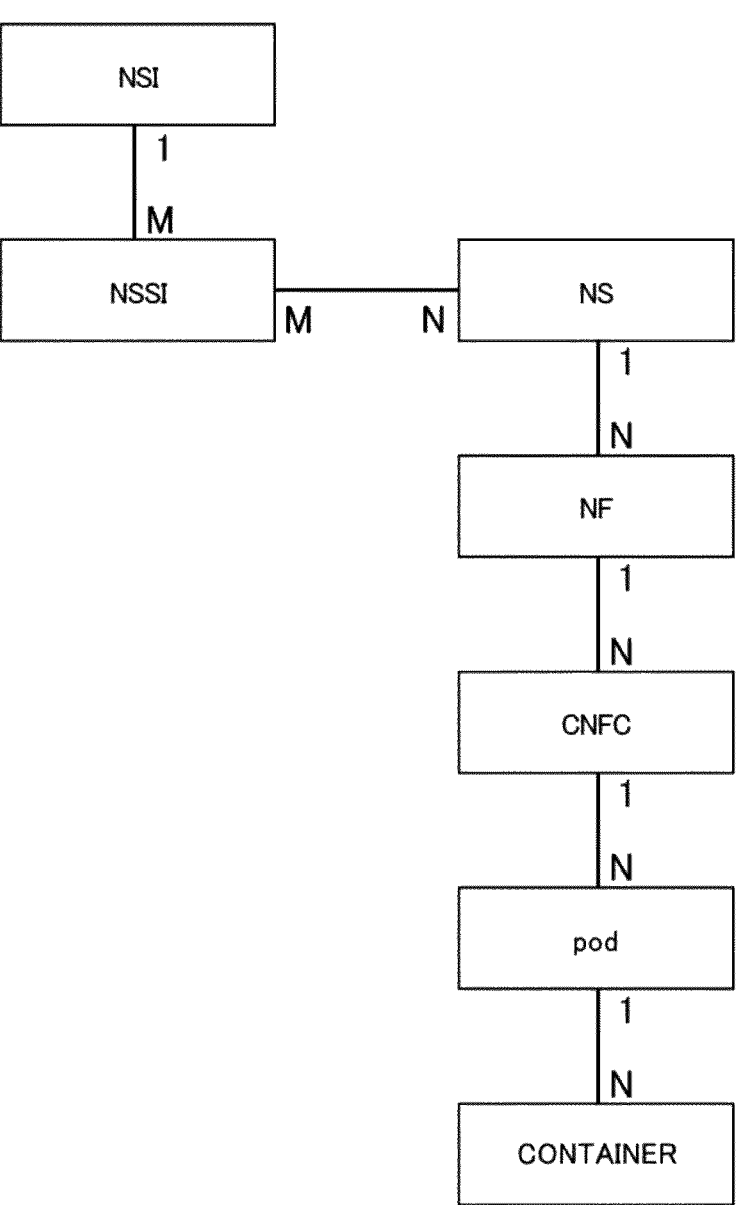
FIG. 4 is a diagram for illustrating an example of links between elements constructed in the communication system in the one embodiment of the present invention.

FIG. 4 is a diagram for schematically illustrating an example of links between elements constructed in the communication system 1 in the present embodiment. Symbols M and N indicated in FIG. 4 each represent any integer of 1 or more, and each indicate a relationship between the numbers of elements connected by a link. When the link has a combination of M and N at both ends thereof, the elements connected by the link have a many-to-many relationship. When the link has a combination of 1 and N or a combination of 1 and M at both ends thereof, the elements connected by the link have a one-to-many relationship.

As illustrated in FIG. 4, a network service (NS), a network function (NF), a containerized network function component (CNFC), a pod, and a container have a hierarchical structure.

The NS corresponds to, for example, a network service formed of a plurality of NFs. Here, the NS may correspond to an element having a granularity, for example, a 5GC, an EPC, a 5G RAN (gNB), or a 4G RAN (eNB).

In 5G, the NF corresponds to an element having a granularity, for example, the RU, the DU, the CU-CP, the CU-UP, the AMF, the SMF, or the UPF. In 4G, the NF corresponds to an element having a granularity, for example, a mobility management entity (MME), a home subscriber server (HSS), a serving gateway (S-GW), a vDU, or a vCU. In the present embodiment, for example, one NS includes one or a plurality of NFS. That is, one or a plurality of NFs are under the control of one NS.

The CNFC corresponds to an element having a granularity, for example, DU mgmt or DU processing. The CNFC may be a microservice deployed on a server as one or more containers. For example, some CNFCs may be microservices that provide a part of the functions of the DU, the CU-CP, the CU-UP, and the like. Some CNFCs may be microservices that provide a part of the functions of the UPF, the AMF, the SMF, and the like. In the present embodiment, for example, one NF includes one or a plurality of CNFCs. That is, one or a plurality of CNFCs are under the control of one NF.

The pod refers to, for example, the minimum unit for managing a Docker container by Kubernetes. In the present embodiment, for example, one CNFC includes one or a plurality of pods. That is, one or a plurality of pods are under the control of one CNFC.

In the present embodiment, for example, one pod includes one or a plurality of containers. That is, one or a plurality of containers are under the control of one pod.

In addition, as illustrated in FIG. 4, a network slice (NSI) and a network slice subnet instance (NSSI) have a hierarchical structure.

The NSIs can be said to be end-to-end virtual circuits that span a plurality of domains (for example, from the RAN 32 to the core network system 34). Each NSI may be a slice for high-speed and high-capacity communication (for example, for enhanced mobile broadband (eMBB)), a slice for high-reliability and low-latency communication (for example, for ultra-reliable and low latency communications (URLLC)), or a slice for connecting a large quantity of terminals (for example, for massive machine type communication (mMTC)). The NSSIs can be said to be single domain virtual circuits dividing an NSI. Each NSSI may be a slice of a RAN domain, a slice of a transport domain such as a mobile backhaul (MBH) domain, or a slice of a core network domain.

In the present embodiment, for example, one NSI includes one or a plurality of NSSIs. That is, one or a plurality of NSSIs are under the control of one NSI. In the present embodiment, a plurality of NSIs may share the same NSSI.

In addition, as illustrated in FIG. 4, the NSSI and the NS generally have a many-to-many relationship.

In addition, in the present embodiment, for example, one NF can belong to one or a plurality of network slices. Specifically, for example, network slice selection assistance information (NSSAI) including one or a plurality of pieces of sub-network slice selection assist information (S-NSSAI) can be set for one NF. Here, the S-NSSAI is information associated with the network slice. The NF is not required to belong to the network slice.

Figure 5:
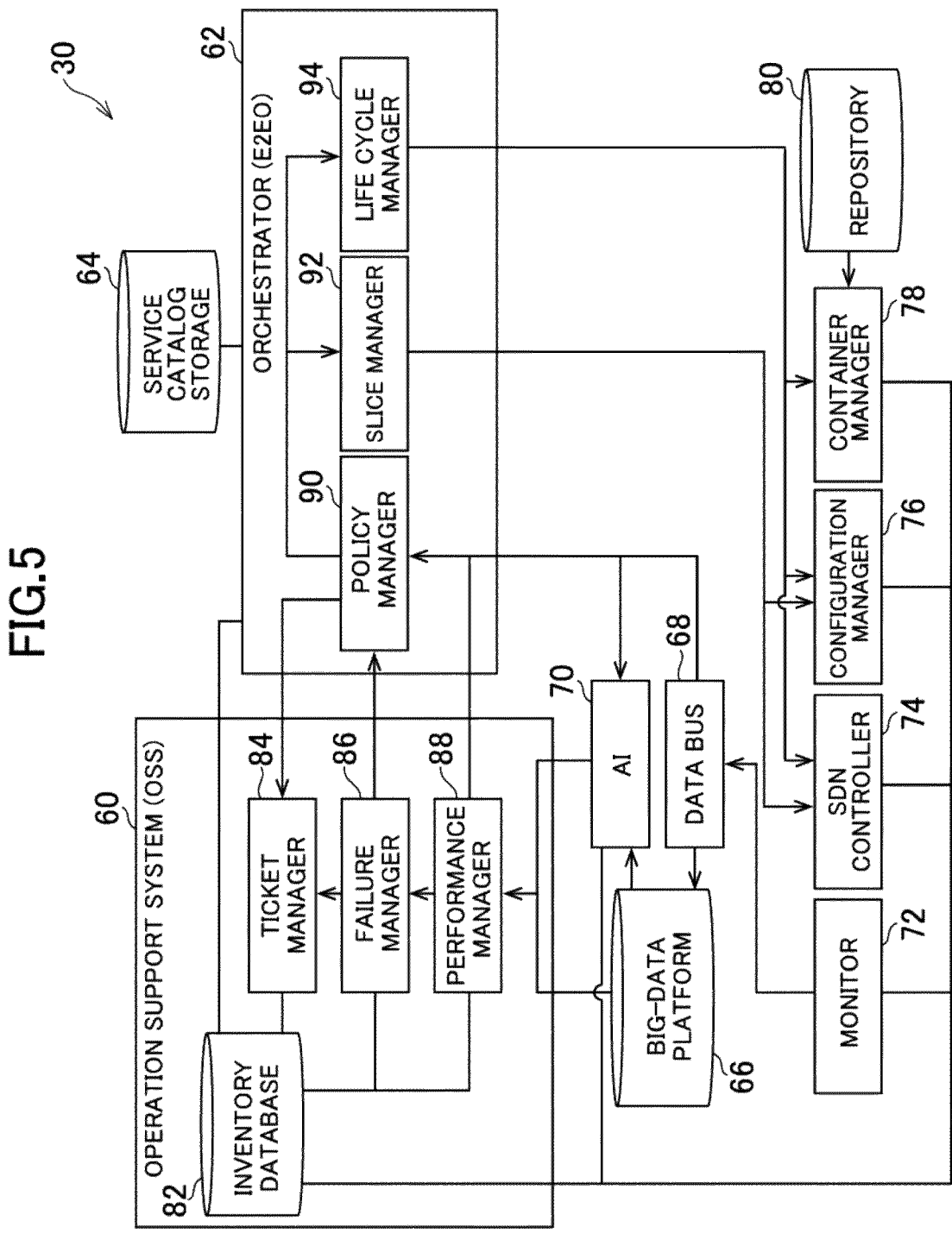
FIG. 5 is a functional block diagram for illustrating an example of functions implemented by a platform system in the one embodiment of the present invention.

FIG. 5 is a functional block diagram for illustrating an example of functions implemented by the platform system 30 in the present embodiment. The platform system 30 in the present embodiment is not required to implement all the functions illustrated in FIG. 5, and may implement functions other than the functions illustrated in FIG. 5.

As illustrated in FIG. 5, the platform system 30 in the present embodiment functionally includes, for example, an operation support system (OSS) 60, an orchestrator (end-to-end-orchestrator (E2EO)) 62, a service catalog storage 64, a big-data platform 66, a data bus 68, an artificial intelligence (AI) 70, a monitor 72, an SDN controller 74, a configuration manager 76, a container manager 78, and a repository 80. The OSS 60 includes an inventory database 82, a ticket manager 84, a failure manager 86, and a performance manager 88. The E2EO 62 includes a policy manager 90, a slice manager 92, and a life cycle manager 94. Those elements are implemented mainly by the processor 30a, the storage device 30b, and the communication device 30c.

The functions illustrated in FIG. 5 may be implemented by executing, by the processor 30a, a program that is installed in the platform system 30, which is one or a plurality of computers, and that includes instructions corresponding to the functions. The program may be supplied to the platform system 30 via a computer-readable information storage medium such as an optical disc, a magnetic disk, a magnetic tape, a magneto-optical disc, a flash memory, or the like, or via the Internet or the like. The functions illustrated in FIG. 5 may also be implemented by a circuit block, a memory, and other LSIs. Further, a person skilled in the art t would understand that the functions illustrated in FIG. 5 can be implemented in various forms by only hardware, by only software, or by a combination of hardware and software.

The container manager 78 executes life cycle management of a container. For example, the life cycle management includes processes relating to the construction of the container such as the deployment and setting of the container.

Here, the platform system 30 in the present embodiment may include a plurality of container managers 78. In each of the plurality of container managers 78, a container management tool such as Kubernetes, and a package manager such as Helm may be installed. Each of the plurality of container managers 78 may execute the construction of a container such as the deployment of the container for a server group (for example, Kubernetes cluster) associated with the container manager 78.

The container manager 78 is not required to be included in the platform system 30. The container manager 78 may be provided in, for example, a server (that is, the RAN 32 or the core network system 34) managed by the container manager 78, or another server that is annexed to the server managed by the container manager 78.

In the present embodiment, the repository 80 stores, for example, a container image of a container included in a functional unit group (for example, NF group) that achieves a network service.

The inventory database 82 is a database in which inventory information is stored. The inventory information includes, for example, information on a server arranged in the RAN 32 or the core network system 34 and managed by the platform system 30.

In addition, in the present embodiment, the inventory database 82 stores inventory data. The inventory data indicates the current statuses of the configuration of an element group included in the communication system 1 and the link between the elements. In addition, the inventory data indicates the status of resources managed by the platform system 30 (for example, resource usage status). The inventory data may be physical inventory data or may be logical inventory data. The physical inventory data and the logical inventory data are described later.

FIG. 6 is a diagram for illustrating an example of data structure of the physical inventory data. The physical inventory data illustrated in FIG. 6 is associated with one server. The physical inventory data illustrated in FIG. 6 includes, for example, a server ID, location data, building data, floor number data, rack data, specification data, network data, operating container ID list, and a cluster ID.

The server ID included in the physical inventory data is, for example, an identifier of the server associated with the physical inventory data.

The location data included in the physical inventory data is, for example, data indicating the location of the server (for example, the address of the location) associated with the physical inventory data.

The building data included in the physical inventory data is, for example, data indicating a building (for example, a building name) in which the server associated with the physical inventory data is arranged.

The floor number data included in the physical inventory data is, for example, data indicating a floor number at which the server associated with the physical inventory data is arranged.

The rack data included in the physical inventory data is, for example, an identifier of a rack in which the server associated with the physical inventory data is arranged.

The specification data included in the physical inventory data is, for example, data indicating the specifications of the server associated with the physical inventory data. The specification data indicates, for example, the number of cores, the memory capacity, and the hard disk capacity.

The network data included in the physical inventory data is, for example, data indicating information relating to a network of the server associated with the physical inventory data. The network data indicates, for example, an NIC included in the server, the number of ports included in the NIC, and a port ID of each of the ports.

The operating container ID list included in the physical inventory data is, for example, data indicating information relating to one or a plurality of containers operating in the server associated with the physical inventory data. The operating container ID list indicates, for example, a list of identifiers (container IDs) of instances of the containers.

The cluster ID included in the physical inventory data is, for example, an identifier of a cluster (for example, Kubernetes cluster) to which the server associated with the physical inventory data belongs.

The logical inventory data includes topology data for a plurality of elements included in the communication system 1, which indicates the current status of such link between the elements as illustrated in FIG. 4. For example, the logical inventory data includes topology data including an identifier of a certain NS and an identifier of one or a plurality of NFs under the control of the certain NS. In addition, for example, the logical inventory data includes topology data including an identifier of a certain network slice and an identifier of one or a plurality of NFs belonging to the certain network slice.

The inventory data may also include data indicated by the current status of, for example, a geographical relationship or a topological relationship between the elements included in the communication system 1. As described above, the inventory data includes location data indicating locations at which the elements included in the communication system 1 are operating, that is, the current locations of the elements included in the communication system 1. It can be said therefrom that the inventory data indicates the current status of the geographical relationship between the elements (for example, geographical closeness between the elements).

The logical inventory data may also include NSI data indicating information relating to a network slice. The NSI data indicates, for example, attributes such as an identifier of an instance of the network slice and the type of the network slice. The logical inventory data may also include NSSI data indicating information relating to a network slice subnet. The NSSI data indicates, for example, attributes such as identifier of an instance of the network slice subnet and the type of the network slice subnet.

The logical inventory data may also include NS data indicating information relating to an NS. The NS data indicates, for example, attributes such as an identifier of an instance of the NS and the type of the NS. The logical inventory data may also include NF data indicating information relating to an NF. The NF data indicates, for example, attributes such as an identifier of an instance of the NF and the type of the NF. The logical inventory data may also include CNFC data indicating information relating to the CNFC. The CNFC data indicates, for example, attributes such as an identifier of an instance and the type of the CNFC. The logical inventory data may also include pod data indicating information relating to the pod included in the CNFC. The pod data indicates, for example, attributes such as an identifier of an instance of the pod and the type of the pod. The logical inventory data may also include container data indicating information relating to the container included in the pod. The container data indicates, for example, attributes such as a container ID of an instance of the container and the type of the container.

With the container ID of the container data included in the logical inventory data and the container ID included in the operating container ID list included in the physical inventory data, an instance of the container and the server on which the instance of the container is operating become linked to each other.

Further, data indicating various attributes such as the host name and the IP address may be included in the above-mentioned data included in the logical inventory data. For example, the container data may include data indicating the IP address of a container corresponding to the container data. Further, for example, the NF data may include data indicating the IP address and the host name of an NF indicated by the NF data.

The logical inventory data may also include data indicating NSSAI including one or a plurality of pieces of S-NS-SAI, which is set for each NF.

In addition, the inventory database 82 can appropriately grasp the resource status in cooperation with the container manager 78. Then, the inventory database 82 appropriately updates the inventory data stored in the inventory database 82 based on the latest resource status.

Further, for example, the inventory database 82 updates the inventory data stored in the inventory database 82 in accordance with execution of an action, such as construction of a new element included in the communication system 1, a change of a configuration of the elements included in the communication system 1, scaling of the elements included in the communication system 1, or replacement of the elements included in the communication system 1.

The service catalog storage 64 stores service catalog data. The service catalog data may include, for example, service template data indicating the logic to be used by the life cycle manager 94 or the like. The service template data includes information required for constructing the network service. For example, the service template data includes information defining the NS, the NF, and the CNFC and information indicating an NS-NF-CNFC correspondence relationship. Further, for example, the service template data contains a workflow script for constructing the network service.

An NS descriptor (NSD) is an example of the service template data. The NSD is associated with a network service, and indicates, for example, the types of a plurality of functional units (for example, a plurality of CNFs) included in the network service. The NSD may indicate the number of CNFs or other functional units included in the network service for each type thereof. The NSD may also indicate a file name of a CNFD described later, which relates to the CNF included in the network service.

Further, a CNF descriptor (CNFD) is an example of the service template data. The CNFD may indicate computer resources (for example, CPU, memory, and hard disk drive) required by the CNF. For example, the CNFD may also indicate, for each of a plurality of containers included in the CNF, computer resources (CPU, memory, hard disk drive, and the like) required by the container.

The service catalog data may also include information to be used by the policy manager 90, the information relating to a threshold value (for example, threshold value for abnormality detection) to be compared to the calculated performance index value. The performance index value is described later.

The service catalog data may also include, for example, slice template data. The slice template data includes information required for executing instantiation of the network slice, and includes, for example, the logic to be used by the slice manager 92.

The slice template data includes information on a "generic network slice template" defined by the GSM Association (GSMA) ("GSM" is a trademark). Specifically, the slice template data includes network slice template data (NST), network slice subnet template data (NSST), and network service template data. The slice template data also includes information indicating the hierarchical structure of those elements which is illustrated in FIG. 4.

In the present embodiment, for example, the life cycle manager 94 constructs a new network service for which a purchase request has been made in response to the purchase request for the NS by the purchaser.

The life cycle manager 94 may execute, for example, the workflow script associated with the network service to be purchased in response to the purchase request. Then, the life cycle manager 94 may execute the workflow script, to thereby instruct the container manager 78 to deploy the container included in the new network service to be purchased. Then, the container manager 78 may acquire the container image of the container from the repository 80 and deploy a container corresponding to the container image in the server.

In addition, in the present embodiment, the life cycle manager 94 executes, for example, scaling or replacement of the element included in the communication system 1. Here, the life cycle manager 94 may output a container deployment instruction or deletion instruction to the container manager 78. Then, the container manager 78 may execute, for example, a process of deploying a container or a process of deleting a container in accordance with the instruction. In the present embodiment, the life cycle manager 94 can execute such scaling and replacement that cannot be handled by Kubernetes of the container manager 78 or other tools.

The life cycle manager 94 may also output an instruction to create a communication route to the SDN controller 74. For example, the life cycle manager 94 presents, to the SDN controller 74, two IP addresses at both ends of a communication route to be created, and the SDN controller 74 creates a communication route connecting those two IP addresses to each other. The created communication route may be managed so as to be linked to those two IP addresses.

The life cycle manager 94 may also output, to the SDN controller 74, an instruction to create a communication route between two IP addresses linked to the two IP addresses.

In the present embodiment, the slice manager 92 executes, for example, instantiation of a network slice. In the present embodiment, the slice manager 92 executes, for example, instantiation of a network slice by executing the logic indicated by the slice template stored in the service catalog storage 64.

The slice manager 92 includes, for example, a network slice management function (NSMF) and a network slice sub-network management function (NSSMF) described in the Third Generation Partnership Project (3GPP) (trademark) specification "TS28 533." The NSMF is a function of generating and managing network slices, and provides an NSI management service. The NSSMF is a function of generating and managing network slice subnets forming a part of a network slice, and provides an NSSI management service.

The slice manager 92 may output a configuration management instruction related to the instantiation of the network slice to the configuration manager 76. Then, the configuration manager 76 may execute configuration management such as settings in accordance with the configuration management instruction.

The slice manager 92 may also present, to the SDN controller 74, two IP addresses to output an instruction to create a communication route between those two IP addresses.

In the present embodiment, for example, the configuration manager 76 executes configuration management such as settings of the element group including the NFs in accordance with the configuration management instruction received from the life cycle manager 94 or the slice manager 92.

In the present embodiment, for example, the SDN controller 74 creates the communication route between the two IP addresses linked to the creation instruction in accordance with the instruction to create the communication route, which has been received from the life cycle manager 94 or the slice manager 92. The SDN controller 74 may create a communication route between two IP addresses through use of, for example, a publicly known path calculation method such as Flex Algo.

Here, for example, the SDN controller 74 may use a segment routing technology (for example, segment routing IPV6 (SRv6)) to construct an NSI and NSSI for the server or an aggregation router present between communication routes. In addition, the SDN controller 74 may generate an NSI and NSSI extending over a plurality of NFs to be set by issuing, to the plurality of NFs to be set, a command to set a common virtual local area network (VLAN) and a command to assign a bandwidth and a priority indicated by the setting information to the VLAN.

The SDN controller 74 may, for example, change the maximum value of the bandwidth that can be used for communication between two IP addresses without constructing a network slice.

The platform system 30 in the present embodiment may include a plurality of SDN controllers 74. Each of the plurality of SDN controllers 74 may execute a process such as the creation of a communication route for a network device group including the aggregation routers associated with the SDN controller 74.

In the present embodiment, the SDN controller 74 may appropriately change the created communication route. For example, the SDN controller 74 may detect occurrence of a failure in a network device associated with the SDN controller 74, and in response to the detection, may switch the communication route that is created by the SDN controller 74 to run through the network device to a communication route that does not run through the network device.

The life cycle manager 94 or the slice manager 92 may output a change instruction to change a communication route to the SDN controller 74. The SDN controller 74 may follow the change instruction to change a communication route created by the SDN controller 74.

For example, the life cycle manager 94 or the slice manager 92 may output, to the SDN controller 74, a change instruction to change a communication route linked to an identifier of a network device to be excluded from a communication route. When receiving the change instruction, the SDN controller 74 may switch a communication route created by the SDN controller 74 to a communication route from which the network device identified by the identifier linked to the change instruction is excluded (that is, a communication route that does not run through the network device identified by the identifier linked to the change instruction).

In the present embodiment, the monitor 72 monitors, for example, the element group included in the communication system 1 based on a given management policy. Here, for example, the monitor 72 may monitor the element group based on a monitoring policy designated by the purchaser when the purchaser purchases the network service.

In the present embodiment, the monitor 72 executes monitoring at various levels, for example, a slice level, an NS level, an NF level, a CNFC level, and a level of hardware such as the server.

For example, the monitor 72 may set a module that outputs metric data in the hardware such as the server or a software element included in the communication system 1 so that monitoring can be performed at the various levels described above. Here, for example, the NF may output the metric data indicating a metric that can be measured (that can be identified) by the NF to the monitor 72. Further, the server may output the metric data indicating a metric relating to the hardware that can be measured (that can be identified) by the server to the monitor 72.

In addition, for example, the monitor 72 may deploy, in the server, a sidecar container that aggregates the metric data indicating the metrics output from a plurality of containers in units of CNFCs (microservices). The sidecar container may include an agent called "exporter." The monitor 72 may repeatedly execute a process of acquiring the metric data aggregated in units of microservices from the sidecar container, at predetermined monitoring intervals through use of the mechanism of a monitoring tool such as Prometheus that can monitor a container management tool such as Kubernetes.

The monitor 72 may monitor performance index values regarding performance indices described in, for example, "TS 28.552, Management and orchestration; 5G performance measurements" or "TS 28.554, Management and orchestration; 5G end to end Key Performance Indicators (KPI)." Then, the monitor 72 may acquire metric data indicating the performance index values to be monitored.

Then, in the present embodiment, the monitor 72 executes, for example, a process (enrichment) of aggregating the metric data in predetermined aggregation units, to thereby generate performance index value data indicating the performance index values of the elements included in the communication system 1 in the aggregation units.

For example, for one gNB, the metric data indicating the metrics of the elements (for example, network nodes such as the DUs 42 and the CUS 44) under the control of the gNB are aggregated, to thereby generate the performance index value data on the gNB. In such a manner, the performance index value data indicating communication performance in an area covered by the gNB is generated. Here, for example, the performance index value data indicating a plurality of types of communication performance, such as a traffic amount (throughput) and latency, may be generated for each gNB. In addition, the metric data indicating the metrics of a certain element (for example, DU 42) during a predetermined period may be aggregated, to thereby generate the performance index value data indicating the communication performance of the element during the predetermined period. The communication performance indicated by the performance index value data is not limited to the traffic amount and the latency.

Then, the monitor 72 outputs, to the data bus 68, the performance index value data generated by the above-mentioned enrichment.

In the present embodiment, the data bus 68 receives, for example, the performance index value data output from the monitor 72. Then, the data bus 68 generates, based on one or a plurality of pieces of performance index value data that have been received, a performance index value file including the one or the plurality of pieces of performance index value data. Then, the data bus 68 outputs the generated performance index value file to the big-data platform 66.

Further, the elements, such as the network slice, the NS, the NF, the CNFC, that are included in the communication system 1 and the hardware such as the server notify the monitor 72 of various alerts (for example, notify the monitor 72 of an alert with the occurrence of a failure as a trigger).

Then, for example, when the monitor 72 receives the above-mentioned notification of the alert, the monitor 72 outputs alert message data indicating the notification to the data bus 68. Then, the data bus 68 generates an alert file obtained by combining one or a plurality of pieces of alert message data each indicating the notification into one file, and outputs the alert file to the big-data platform 66.

In the present embodiment, the big-data platform 66 accumulates, for example, the performance index value files and the alert files that have been output from the data bus 68.

In the present embodiment, for example, the AI 70 stores in advance a plurality of trained machine learning models. The AI 70 uses various machine learning models stored in the AI 70 to execute an estimation process such as a future prediction process for a use status and quality of service of the communication system 1. The AI 70 may generate estimation result data indicating results of the estimation process.

The AI 70 may execute the estimation process based on the files accumulated in the big-data platform 66 and the above-mentioned machine learning models. The estimation process is suitable when long-term trend prediction is performed infrequently.

The AI 70 can also acquire the performance index value data stored in the data bus 68. The AI 70 may execute the estimation process based on the performance index value data stored in the data bus 68 and the above-mentioned machine learning models. The estimation process is suitable when short-term prediction is performed frequently.

In the present embodiment, for example, the performance manager 88 calculates, based on a plurality of pieces of metric data, a performance index value (for example, KPI) that is based on metrics indicated by those pieces of metric data. The performance manager 88 may calculate a performance index value (for example, performance index value relating to an end-to-end network slice) which is a comprehensive evaluation of a plurality of types of metrics and cannot be calculated from a single piece of metric data. The performance manager 88 may generate comprehensive performance index value data indicating a performance index value being a comprehensive evaluation.

The performance manager 88 may acquire the above-mentioned performance index value file from the big-data platform 66. The performance manager 88 may also acquire the estimation result data from the AI 70. Then, the performance index value such as the KPI may be calculated based on at least one of the performance index value file or the estimation result data. The performance manager 88 may acquire the metric data directly from the monitor 72. Then, the performance index value such as the KPI may be calculated based on the metric data.

In the present embodiment, the failure manager 86 detects the occurrence of a failure in the communication system 1 based on, for example, at least any one of the above-mentioned metric data, the above-mentioned notification of the alert, the above-mentioned estimation result data, or the above-mentioned comprehensive performance index value data. The failure manager 86 may detect, for example, the occurrence of a failure that cannot be detected from a single piece of metric data or a single notification of the alert, based on a predetermined logic. The failure manager 86 may also generate detection failure data indicating the detected failure.

The failure manager 86 may acquire the metric data and the notification of the alert directly from the monitor 72. The failure manager 86 may also acquire the performance index value file and the alert file from the big-data platform 66. The failure manager 86 may also acquire the alert message data from the data bus 68.

In the present embodiment, the policy manager 90 executes a predetermined determination process based on, for example, at least any one of the above-mentioned metric data, the above-mentioned performance index value data, the above-mentioned alert message data, the above-mentioned performance index value file, the above-mentioned alert file, the above-mentioned estimation result data, the above-mentioned comprehensive performance index value data, or the above-mentioned detection failure data.

Then, the policy manager 90 may execute an action corresponding to a result of the determination process. For example, the policy manager 90 may output an instruction to construct a network slice to the slice manager 92. In addition, for example, the policy manager 90 may output, to the slice manager 92, an instruction to switch the communication route. The policy manager 90 may also output an instruction for scaling or replacement of the elements to the life cycle manager 94 based on the result of the determination process.

The policy manager 90 in the present embodiment can acquire the performance index value data stored in the data bus 68. Then, the policy manager 90 may execute the predetermined determination process based on the performance index value data acquired from the data bus 68. The policy manager 90 may also execute the predetermined determination process based on the alert message data stored in the data bus 68.

In the present embodiment, the ticket manager 84 generates, for example, a ticket indicating information to be notified to an administrator of the communication system 1. The ticket manager 84 may generate a ticket indicating details of the detection failure data. The ticket manager 84 may also generate a ticket indicating a value of the performance index value data or the metric data. The ticket manager 84 may also generate a ticket indicating a determination result obtained by the policy manager 90.

Then, the ticket manager 84 notifies the administrator of the communication system 1 of the generated ticket. The ticket manager 84 may transmit, for example, an email to which the generated ticket is attached to an email address of the administrator of the communication system 1.

In the communication system 1 in the present embodiment, there may occur deterioration of the performance (so-called silent failure) of, for example, NSes and NFS, without an abnormality such as a failure being detected.

Now, an example of countermeasures to be taken against occurrence of a silent failure executed in the platform system 30 in the present embodiment is described. Elements in which a communication function is implemented, such as NSes and NFs, are hereinafter referred to as "function elements."

In the communication system 1 in the present embodiment, a plurality of network slices are constructed. A separate group of routers is set as components for each of the plurality of network slices constructed in the communication system 1 in the present embodiment. A router shared by the plurality of network slices may be set as a component.

Figure 7:
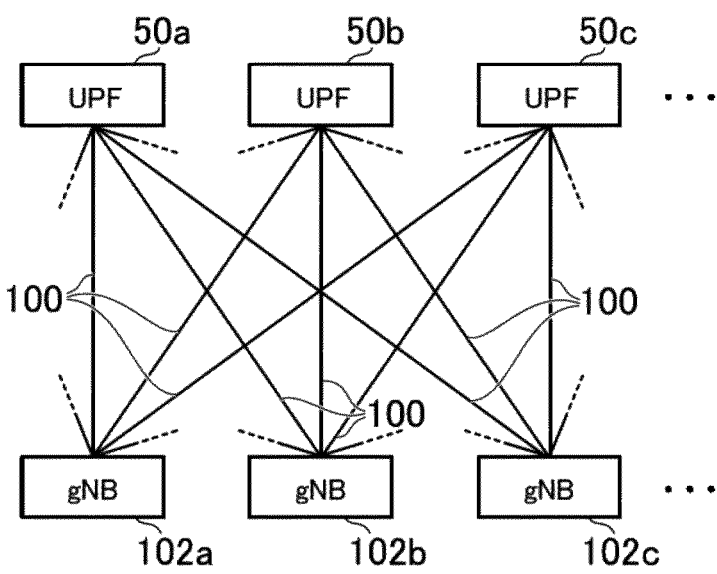
FIG. 7 is a diagram for schematically illustrating an example of a configuration of a group of function elements which hold communication with use of network slices.

FIG. 7 is a diagram for schematically illustrating an example of a configuration of a group of function elements each of which holds communication with use of a network slice that is one of the plurality of network slices constructed in the communication system 1 in the present embodiment.

The network slice illustrated in FIG. 7 includes a plurality of segment routing paths 100 as components. In the present embodiment, each of the plurality of network slices constructed in the communication system 1 may thus include one or a plurality of segment routing paths 100 as components. Packet forwarding by segment routing (for example, packet forwarding by SRv6 or by Segment Routing Multi-Protocol Label Switching (SRMPLS)) is executed on the segment routing paths 100. Each of the plurality of segment routing paths 100 may include routers as components. A router shared by the plurality of segment routing paths 100 may be set as a component.

In the present embodiment, one or a plurality of network slices out of the plurality of network slices constructed in the communication system 1 are available to each one of the function elements included in the communication system 1. The function element included in the communication system 1 can use the network slice available to the function element to hold communication. Communication held by the function element with the use of the network slice available to the function element is hereinafter referred to as "slice communication."

In the example of FIG. 7, the group of function elements which hold communication with the use of the network slice includes a plurality of UPFs 50 (50a, 50b, 50c . . . ) and a plurality of gNBs 102 (102a, 102b, 102c . . . ). The gNBs 102 include the DUs 42 and the CUs 44. The group of function elements which hold communication with the use of the network slice may include other types of function elements (for example, the AMFs 46 and SMFs 48).

In the communication system 1 in the present embodiment, for each of the plurality of network slices constructed in the communication system 1, a group of routers that form the network slice is managed. For example, the inventory database 82 may store, for each of the plurality of network slices constructed in the communication system 1, router group data indicating the group of routers that form the network slice.

The router group data in the present embodiment may include, for example, segment routing path management data exemplified in FIG. 8 and router group management data exemplified in FIG. 9.

The segment routing path management data in the present embodiment is, for example, data indicating one or a plurality of segment routing paths out of the segment routing paths 100 on which packets are forwarded in communication held by a function element with the use of a network slice available to the function element.

As shown in FIG. 8, the segment routing path management data includes, for example, a function element ID, a slice ID, and a segment routing path ID list.

A piece of segment routing path management data links a function element ID which is an identifier of a function element to a slice ID which is an identifier of a network slice available to the function element. The piece of segment routing path management data also links a segment routing path ID list, which is a list of identifiers of the segment routing paths 100 (segment routing path IDs) on which packets are forwarded in communication held by the function element with the use of the network slice.

Identifiers of the gNB 102*a*, the gNB 102*b*, and the gNB 102*c* here are "gNB001," "gNB002," and "gNB003," respectively.

In such a case, the segment routing path management data shown in FIG. 8 indicates that a plurality of network slices including three network slices that have slice IDs "001," "002," and "003" are available to every one of the gNB 102*a*, the gNB 102*b*, and the gNB 102*c*. It is not required to set network slices so that available network slices are common to all function elements. Available network slices may vary from one function element to another function element.

The network slice that has the slice ID "001" is hereinafter referred to as "network slice A." The network slice that has the slice ID "002" is hereinafter referred to as "network slice B." The network slice that has the slice ID "003" is hereinafter referred to as "network slice C."

For example, when a slice communication using the network slice A is held by the gNB 102*a*, the communication is held with use of one of the segment routing paths 100 that has one of "001," "002," "003" . . . as the segment routing path ID. When a slice communication using the network slice B is held by the gNB 102*a*, the communication is held with the use of one of the segment routing paths 100 that has one of "011," "012," "013" . . . as the segment routing path ID. When a slice communication using the network slice C is held by the gNB 102*a*, the communication is held with the use of one of the segment routing paths 100 that has one of "021," "022," "023" . . . as the segment routing path ID.

Further, when the slice communication using the network slice A is held by the gNB 102*b*, the communication is held with use of one of the segment routing paths 100 that has one of "101," "102," "103" . . . as the segment routing path ID. When the slice communication using the network slice B is held by the gNB 102*b*, the communication is held with the use of one of the segment routing paths 100 that has one of "111," "112," "113" . . . as the segment routing path ID. When the slice communication using the network slice C is held by the gNB 102*b*, the communication is held with the use of one of the segment routing paths 100 that has one of "121," "122," "123" . . . as the segment routing path ID.

Further, when the slice communication using the network slice A is held by the gNB 102*c*, the communication is held with use of one of the segment routing paths 100 that has one of "201," "202," "203" . . . as the segment routing path ID. When the slice communication using the network slice B is held by the gNB 102*c*, the communication is held with the use of one of the segment routing paths 100 that has one of "211," "212," "213" . . . as the segment routing path ID. When the slice communication using the network slice C is held by the gNB 102*c*, the communication is held with the use of one of the segment routing paths 100 that has one of "221," "222," "223" . . . as the segment routing path ID.

The router group management data in the present embodiment is, for example, data indicating, for each one of the plurality of segment routing paths 100, a group of routers that are components of the segment routing path 100.

As shown in FIG. 9, the router group management data includes, for example, a segment routing path ID and a router ID list. The segment routing path ID is an identifier of one of the segment routing paths 100. As described above, the segment routing path ID corresponds to an element of the segment routing path ID list included in the segment routing path management data. The router group management data links the segment routing path ID to a router ID list, which is a list of identifiers of routers (router IDs) that are components of the one of the segment routing paths 100 that is identified by the segment routing path ID.

For example, the router group management data shown in FIG. 9 indicates that a plurality of routers that form one of the segment routing paths 100 that has the segment routing path ID "011" have identifiers "10000," "10001," "10002" . . . "20001," "20002" . . . . The router group management data also indicates that a plurality of routers that form one of the segment routing paths 100 that has the segment routing path ID "012" have identifiers "10000," "10011," "10012". The router group management data also indicates that a plurality of routers that form one of the segment routing paths 100 that has the segment routing path ID "013" have identifiers "10000," "10021," "10022" . . . .

The router group management data also indicates that a plurality of routers that form one of the segment routing paths 100 that has the segment routing path ID "101" have identifiers "11000," "11001," "11002" . . . . The router group management data also indicates that a plurality of routers that form one of the segment routing paths 100 that has the segment routing path ID "102" have identifiers "11000," "11011," "11012" . . . "20001," "20002" . . . . The router group management data also indicates that a plurality of routers that form one of the segment routing paths 100 that has the segment routing path ID "103" have identifiers "11000," "11021," "11022" . . . .

The router group management data also indicates that a plurality of routers that form one of the segment routing paths 100 that has the segment routing path ID "221" have identifiers "12000," "12001," "12002" . . . . The router group management data also indicates that a plurality of routers that form one of the segment routing paths 100 that has the segment routing path ID "222" have identifiers "12000," "12011," "12012" . . . . The router group management data also indicates that a plurality of routers that form one of the segment routing paths 100 that has the segment routing path ID "223" have identifiers "12000," "12021," "12022" . . . "20001," "20003".

In the example of FIG. 9, the router that has the router ID "20001" is a component shared by three of the segment routing paths 100 that have the segment routing path IDs "011," "102," and "223." Further, the router that has the router ID "20002" is a component shared by two of the segment routing paths 100 that have the segment routing path IDs "011" and "102."

In the present embodiment, as described above, the slice manager 92, the life cycle manager 94, or the SDN controller 74 may change the segment routing paths 100 that are components of a network slice, or routers that are components of one of the segment routing paths 100.

In the present embodiment, in response to such a change of components, the router group data (for example, the segment routing path management data shown in FIG. 8 or the router group management data shown in FIG. 9) stored in the inventory database 82 is updated.

The segment routing paths 100 that are current components of a network slice or a group of routers that are current components of one of the segment routing paths 100 are accordingly identifiable by referring to the router group data.

In the present embodiment, for example, the monitor 72 monitors, for each of the plurality of function elements included in the communication system 1, and for each network slice available to the function element, performance of the function element in the slice communication that uses the network slice.

Specifically, the monitor 72 monitors, for example, performance of the gNB 102a in the slice communication using the network slice A, performance of the gNB 102a in the slice communication using the network slice B, performance of the gNB 102a in the slice communication using the network slice C, performance of the gNB 102b in the slice communication using the network slice A, performance of the gNB 102b in the slice communication using the network slice B, performance of the gNB 102b in the slice communication using the network slice C, performance of the gNB 102c in the slice communication using the network slice A, performance of the gNB 102c in the slice communication using the network slice B, and performance of the gNB 102c in the slice communication using the network slice C.

For example, the monitor 72 generates, at a predetermined time interval (for example, an interval of 15 minutes), for each network slice available to a function element, performance index value data indicating performance of the function element in the slice communication using the network slice in the immediate last period of the predetermined length (for example, the last 15 minutes). Then, for example, the monitor 72 outputs the generated performance index value data to the data bus 68 at the time interval.

For example, in a case in which the performance index value data indicating performance in a certain period is generated, the performance index value data linked to the period may be output to the data bus 68. For example, the performance index value data linked to period data which indicates a start time and an end time of the period may be output to the data bus 68.

In response to the output of the performance index value data to the data bus 68, the policy manager 90 may acquire the output performance index value data.

Examples of the performance indicated by the performance index value data include a throughput, a bearer connection count, an attached count, and a communication speed (band). A comprehensive value (for example, a linear combination value of a plurality of types of performance index values) calculated based on performance index values that indicate performance of a plurality of types (for example, the throughput and the bearer connection count) may be used as a value of the performance index value data. The performance indicated by the performance index value data is not limited to those mentioned above.

In the present embodiment, the policy manager 90 then selects, for example, a pair formed from one slice communication that is a slice communication held by one of the function elements included in the communication system 1 with use of one of the network slices and another slice communication that is held by one of the function elements included in the communication system 1 with use of one of the network slices and that is not the one slice communication. In short, two separate slice communications are selected to form a pair.

The network slice used to hold the one slice communication may be the same network slice as the network slice used to hold the another slice communication. For example, the one slice communication may be a slice communication held by the gNB 102a with use of the network slice A, and the another slice communication may be a slice communication held by the gNB 102b with the use of the network slice A.

As another example, the network slice used to hold the one slice communication may be a network slice which is other than the network slice used to hold the another slice communication. For example, the one slice communication may be a slice communication held by the gNB 102a with use of the network slice B, and the another slice communication may be a slice communication held by the gNB 102b with the use of the network slice A.

The policy manager 90 then acquires, for example, a plurality of pieces of performance index value data each representing a performance index value that indicates performance of the function element that holds the one slice communication in the one slice communication in the immediate last period of a predetermined length of time, and a plurality of pieces of performance index value data each representing a performance index value that indicates performance of the function element that holds the another slice communication in the another slice communication in the immediate last period of the predetermined length of time.

A performance index value data group including a plurality of pieces of performance index value data each representing a performance index value that indicates performance of the function element that holds the one slice communication in the one slice communication is hereinafter referred to as "first performance index value data group." A performance index value data group including a plurality of pieces of performance index value data each representing a performance index value that indicates performance of the function element that holds the another slice communication in the another slice communication is hereinafter referred to as "second performance index value data group."

For example, in a case in which the predetermined length of time is 3 hours and the performance index value data is acquired at an interval of 15 minutes, the first performance index value data group and the second performance index value data group each include twelve pieces of performance index value data.

A period to which each of the plurality of pieces of performance index value data included in the first performance index value data group is linked is the same period as a period to which each of the plurality of pieces of performance index value data included in the second performance index value data group is linked.

The policy manager 90 then calculates the degree of correlation (for example, a correlation coefficient) indicating strength of correlation between performance index values that are indicated by the plurality of pieces of performance index value data included in the first performance index value data group and performance index values that are indicated by the plurality of pieces of performance index value data included in the second performance index value data group.

The length of a period from the start time of the earliest period out of periods linked to the plurality of pieces of performance index value data included in the first performance index value data group to the end time of the latest period out of the linked periods corresponds to the predetermined length of time described above. Similarly, the length of a period from the start time of the earliest period out of periods linked to the plurality of pieces of performance index value data included in the second performance index value data group to the end time of the latest period out of the linked periods also corresponds to the predetermined length of time described above. The calculated degree of correlation is associated with the period that is the predetermined length of time.

The policy manager 90 then generates, based on the calculated degree of correlation, correlation degree data having data structure an example of which is illustrated in FIG. 10.

As illustrated in FIG. 10, the correlation data is linked to, for example, a first slice communication ID, a second slice communication ID, and date and time data.

For example, a value of the degree of correlation calculated in the manner described above is set to the correlation degree data.

The first slice communication ID is an identifier of the one slice communication. The first slice communication ID includes, for example, a combination of a first function element ID, which is an identifier of the function element that holds the one slice communication, and a first slice ID, which is an identifier of the network slice that is used to hold the one slice communication.

The second slice communication ID is an identifier of the another slice communication. The second slice communication ID includes, for example, a combination of a second function element ID, which is an identifier of the function element that holds the another slice communication, and a second slice ID, which is an identifier of the network slice that is used to hold the another slice communication.

The date and time data is data indicating, for example, a date and time that represents a period associated with the degree of correlation indicated by the correlation degree data. The date and time data may indicate, for example, a data and a time that is the start time or the end time of the period associated with the degree of correlation. As another example, the date and time data may indicate a date and time that is a start time associated with the degree of correlation and a date and time that is an end time associated with the degree of correlation.

In the present embodiment, for example, a piece of correlation degree data is generated for each pair of slice communications which are each held by one of the plurality of function elements included in the communication system 1 with use of one of the network slices. In the following description, a pair of slice communications each held by one of the plurality of function elements included in the communication system 1 with the use of one of the network slices is also referred to as "slice communication pair."

Generation of the correlation degree data is not limited to a particular timing. For example, the correlation degree data may be generated each time the performance index value data is acquired, based on a plurality of pieces of latest performance index value data. In such a case, periods associated with the degrees of correlation indicated by the sequentially generated pieces of correlation degree data partially overlap with one another.

The correlation degree data may also be generated each time a length of time corresponding to the length of a period associated with the degree of correlation elapses, based on a plurality of pieces of latest performance index value data. In the example described above, the correlation degree data may be generated every 3 hours. In such a case, periods associated with the degrees of correlation indicated by sequentially generated pieces of correlation degree data do not overlap with one another.

The policy manager 90 then calculates the degree of correlation decrease, which is linked to a pair of one slice communication which is slice communication held by one of the function elements included in the communication system 1 with the use of one of the network slices and another slice communication which is held by one of the function elements included in the communication system 1 with the use of one of the network slices and which is other than the one slice communication. The degree of correlation decrease is the degree of decrease in strength of correlation between a performance index value indicating performance of the function element that holds the one slice communication in the one slice communication and a performance index value indicating performance of the function element that holds the another slice communication in the another slice communication. For example, the degree of correlation decrease that is the degree of decrease in strength of correlation between the performance index values is calculated based on a plurality of sequentially generated pieces of correlation degree data that are linked to the same first slice communication ID and the same second slice communication ID. The degree of correlation decrease may be the degree of decrease in correlation coefficient of the performance index values.

The policy manager 90 may identify, out of a plurality of pieces of correlation degree data linked to a specific first slice communication ID and a specific second slice communication ID, a piece of correlation degree data linked to the date and time data that indicates the second latest date and time and a piece of correlation degree data linked to the date and time data that indicates the latest date and time, and use a value obtained by subtracting a value of the latter piece of correlation degree data from a value of the former piece of correlation degree data as a value of the degree of correlation decrease that is associated with the combination of the specific first slice communication ID and the specific second slice communication ID.

As another example, the policy manager 90 may extract, from a plurality of pieces of correlation degree data linked to the specific first slice communication ID and the specific second slice communication ID, a predetermined number of pieces of correlation degree data in reverse chronological order, starting from a piece of correlation degree data that is linked to the date and time data indicating the latest date and time. The policy manager 90 may calculate an average value and a standard deviation of values of the extracted correlation degree data. A value obtained by subtracting a value twice the calculated standard deviation from the calculated average value is hereinafter denoted by "v1." That is, when the calculated average value is given as "m" and the calculated standard deviation is given as "s," the value "v1" corresponds to a value "m−2s."

The policy manager 90 may calculate a value obtained by subtracting the value of the piece of correlation degree data that is linked to the date and time data indicating the latest date and time from the value v1, as the value of the degree of correlation decrease that is associated with the combination of the specific first slice communication ID and the specific second slice communication ID.

The policy manager 90 may also extract, from among the predetermined number of sequential pieces of correlation degree data counted from the piece of correlation degree data that is linked to the date and time data indicating the latest date and time, out of the plurality of pieces of correlation degree data that are linked to the specific first slice communication ID and the specific second slice communication ID, pieces of correlation degree data that have values smaller than the value v1 described above. The policy manager 90 may then calculate, for each of at least one piece of extracted correlation degree data, a difference obtained by subtracting a value of the extracted piece of correlation degree data from the value v1, and calculate a sum of the differences as the value of the degree of correlation decrease that is associated with the combination of the specific first slice communication ID and the specific second slice communication ID.

Examples of the degree of correlation decrease are not limited to those described above.

The policy manager 90 may generate, based on the degree of correlation decrease calculated in the manner described above, correlation decrease degree data having data structure an example of which is illustrated in FIG. 11.

As illustrated in FIG. 11, the correlation decrease degree data is linked to, for example, a first slice communication ID, a second slice communication ID, and date and time data.

For example, the value of the degree of correlation decrease calculated in the manner described above is set to the correlation decrease degree data.

For example, a first slice communication ID and a second slice communication ID that are linked to the calculated degree of correlation decrease are set to the first slice communication ID and the second slice communication ID, respectively.

For example, in a case of calculating the degree of correlation decrease based on a plurality of pieces of correlation degree data, a date and time that represents the plurality of pieces of correlation degree data is set to the date and time data. For example, out of the plurality of pieces of correlation degree data, a piece of correlation degree data linked to the date and time data indicating the latest date and time may be identified in order to set the latest date and time as a value of the date and time data of the correlation decrease degree data. As another example, out of the plurality of pieces of correlation degree data, a piece of correlation degree data linked to the date and time data indicating the oldest date and time may be identified in order to set the oldest date and time as a value of the date and time data of the correlation decrease degree data.

In the present embodiment, the correlation decrease degree data is generated for each slice communication pair, for example.

In the present embodiment, for example, the policy manager 90 then acquires the degree of correlation decrease, which is linked to a pair of one slice communication which is slice communication held by one of the function elements included in the communication system 1 with the use of one of the network slices and another slice communication which is held by one of the function elements included in the communication system 1 with the use of one of the network slices and which is other than the one slice communication. The degree of correlation decrease is the degree of decrease in strength of correlation between a performance index value indicating performance of the function element that holds the one slice communication in the one slice communication and a performance index value indicating performance of the function element that holds the another slice communication in the another slice communication.

In the present embodiment, for example, the policy manager 90 determines, for each one of a plurality of slice communication pairs, whether the degree of correlation decrease linked to the slice communication pair satisfies a given decrease determination condition.

The policy manager 90 may acquire the correlation decrease degree data described above. The policy manager 90 may determine whether the value of the correlation decrease degree data satisfies the decrease determination condition based on the acquired correlation decrease degree data.

The policy manager 90 may acquire a plurality of pieces of latest correlation decrease degree data. The policy manager 90 may determine whether a combination of the plurality of pieces of correlation decrease degree data satisfies the decrease determination condition.

It is assumed that, for example, the value of the degree of correlation decrease is a value obtained by subtracting a value of a piece of correlation degree data that is linked to the date and time data indicating the latest date and time from a value of a piece of correlation degree data that is linked to the date and time data indicating the second latest date and time. In such a case, the decrease determination condition may be "the value of the correlation decrease degree data is equal to or more than a predetermined value." As another example, the decrease determination condition may be "every one of a predetermined number (for example, three) of pieces of correlation decrease degree data from a piece of correlation decrease degree data that is linked to the date and time data indicating the latest date and time has a value equal to or more than a predetermined value."

It is assumed that, for example, the correlation decrease degree data has a value obtained by subtracting the value of a piece of correlation degree data that is linked to the date and time data indicating the latest date and time from the value "v1" described above. In such a case, the decrease determination condition may be "the value of the correlation decrease degree data is positive." As another example, the decrease determination condition may be "every one of a predetermined number (for example, three) of pieces of correlation decrease degree data from a piece of correlation decrease degree data that is linked to the date and time data indicating the latest date and time has a positive value."

To give another example, in a case in which the value of the degree of correlation decrease is a sum obtained by calculating, for each of at least one piece of extracted correlation degree data, a difference through subtraction of a value of the extracted piece of correlation degree data from the value v1, and then calculating a sum of the differences, the decrease determination condition may be "the value of the correlation decrease degree data is equal to or more than a predetermined number."

Figure 12A:
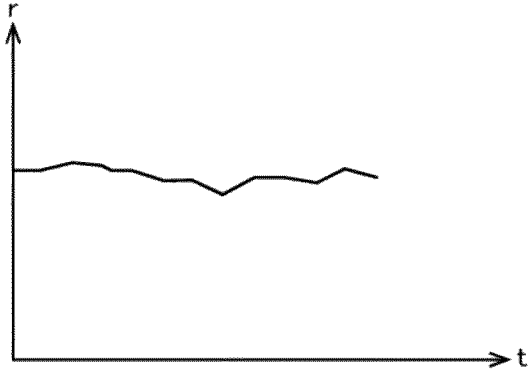
FIG. 12A is a graph for schematically showing an example of transition in the degree of correlation in a case in which the degree of correlation decrease fails to satisfy a decrease determination condition.
Figure 12B:
FIG. 12B is a graph for schematically showing an example of transition in the degree of correlation in a case in which the degree of correlation decrease satisfies the decrease determination condition.
Figure 12C:
FIG. 12C is a graph for schematically showing another example of transition in the degree of correlation in the case in which the degree of correlation decrease satisfies the decrease determination condition.

FIG. 12A is a graph for schematically showing an example of transition in the degree of correlation in a case in which the degree of correlation decrease fails to satisfy the decrease determination condition. FIG. 12B and FIG. 12C are each a graph for schematically showing an example of transition in the degree of correlation in a case in which the degree of correlation decrease satisfies the decrease determination condition.

In FIG. 12A, FIG. 12B, and FIG. 12C, an axis of abscissa indicates a date and time "t," which represents a period associated with the degree of correlation, and an axis of ordinate indicates a correlation degree "r."

For example, a case in which the latest degree of correlation greatly decreases from the preceding degree of correlation as shown in FIG. 12B corresponds to a typical example of a case in which the degree of correlation decrease satisfies the decrease determination condition.

A case in which the degree of correlation greatly fluctuates as shown in FIG. 12C corresponds to a typical example of the case in which the degree of correlation decrease satisfies the decrease determination condition.

In the present embodiment, for example, the policy manager 90 identifies, for each one of a plurality of slice communications held in the communication system 1, the number of slice communication pairs that include the slice communication and that are linked to the degrees of correlation decrease satisfying the decrease determination condition (hereinafter referred to as "qualifying pair count").

In the present embodiment, for example, the policy manager 90 determines, for each one of the plurality of slice communications held in the communication system 1, whether the qualifying pair count identified for the slice communication satisfies a given pair count condition.

In the present embodiment, for example, the policy manager 90 then identifies, based on the router group data, a group of routers located on a route of a slice communication for which a slice communication pair count that satisfies the given pair count condition is identified. The policy manager 90 estimates at least one router included in the identified group of routers as a router that is a cause of deterioration of performance of function elements related to the slice communication. The route may be, as described above, a route on which packets are forwarded by segment routing.

The pair count condition may be, for example, "the qualifying pair count is higher than a predetermined count." In such a case, the policy manager 90 estimates at least one router included in a group of routers located on a route of a slice communication for which a slice communication pair count that is higher than the predetermined count is identified as a router that is a cause of deterioration of performance of function elements related to the slice communication.

The pair count condition may be "a proportion of the number of slice communication pairs that include a certain slice communication and that are linked to the degrees of correlation decrease satisfying the decrease determination condition to a total count of slice communication pairs that include the certain slice communication is higher than a predetermined proportion." In such a case, the policy manager 90 may identify, for each one of the plurality of slice communications held in the communication system 1, the proportion of the number of slice communication pairs that include the slice communication pair and that are linked to the degrees of correlation decrease satisfying the decrease determination condition to the total count of slice communication pairs that include the slice communication. The policy manager 90 may then estimate at least one router included in a group of routers located on a route of a slice communication for which a proportion higher than the predetermined proportion is identified as a router that is a cause of deterioration of performance of function elements related to the slice communication.

It is assumed that, for example, the slice communication held by the gNB 102*a* with the use of the network slice B satisfies the pair count condition. In such a case, for example, segment routing path IDs included in a segment routing path ID list that is linked to the function element ID "gNB001" and the slice ID "002" in the segment routing path management data are identified. The segment routing path IDs identified here are, for example, "011," "012," and "013."

For each of the thus identified segment routing path IDs, router IDs included in a router ID list that is linked to the segment routing path ID are identified in the router group management data.

Examples of the router ID list identified here include a router ID list that is linked to the segment routing path ID "011" in the router group management data, a router ID list that is linked to the segment routing path ID "012" therein, and a router ID list that is linked to the segment routing path ID "013" therein.

Router IDs included in at least one of the thus identified router ID lists are then identified. A group of router IDs including router IDs identified in such a manner is hereinafter referred to as "cause candidate router ID group." For example, "10000," "10001," "10002," "10011," "10012," "10021," "10022," "20001," "20002" . . . are identified here as a cause candidate router ID group linked to the gNB 102*a* and the network slice B.

In the present embodiment, a router identified by a router ID included in the thus identified cause candidate router ID group is estimated as a cause of the deterioration of performance of the gNB 102*a*. Every router identified by a router ID included in the cause candidate router ID group may be estimated as a router that is a cause of deterioration of performance of the gNB 102*a*.

In the present embodiment, there is a case in which the identified slice communication pair count satisfies the pair count condition in each of a plurality of slice communications. In such a case, the policy manager 90 may estimate at least one router included in every group of routers located on routes of the plurality of slice communications as a router that is a cause of deterioration of performance of a plurality of function elements related to the plurality of slice communications.

It is assumed that, for example, in addition to the slice communication held by the gNB 102*a* with the use of the network slice B, the slice communication held by the gNB 102*b* with the use of the network slice A and the slice communication held by the gNB 102*c* with the use of the network slice C satisfy the pair count condition.

In such a case, as described above, "10000," "10001," "10002," "10011," "10012," "10021," "10022," "20001," "20002" . . . are identified as a cause candidate router ID group associated with the gNB 102*a* and the network slice B.

In the same manner, "11000," "11001," "11002," "11011," "11012," "11021," "11022," "20001," "20002" . . . are identified as a cause candidate router ID group associated with the gNB 102*b* and the network slice A.

Then, "12000," "12001," "12002," "12011," "12012," "12021," "12022," "20001," "20003" . . . are identified as a cause candidate router ID group associated with the gNB 102*c* and the network slice C.

Then, "20001," which is a router ID included in every one of the three cause candidate router ID groups, is thus estimated as the router ID of the router that is a cause of the deterioration of performance of the function elements.

The number of routers estimated as routers that are causes of deterioration of performance of function elements is not particularly prescribed.

In the present embodiment, for example, the slice manager 92 may output, to the SDN controller 74, for each of the one or the plurality of routers estimated as the causes of the deterioration of performance of the function elements, a change instruction to change a communication route with respect to a network slice that includes the router as a component. The SDN controller 74 may follow the change instruction to execute a switch to a communication route created by the SDN controller 74.

For example, the slice manager 92 may output, to the SDN controller 74 that is linked to the router estimated as the cause of the deterioration of performance of the function elements, a change instruction to change a communication route linked to the router ID of the router. When receiving the change instruction, the SDN controller 74 may switch the communication route created by the SDN controller 74 to a communication route from which the router identified by the router ID is excluded (that is, a communication route that does not run through the router).

An administrator or the like of the platform system 30 may check, for each of the routers estimated as the causes of the deterioration of performance of the function elements, whether the router is experiencing a trouble such as a failure or exceeding of a capacity. The administrator or the like of the platform system 30 may then output, to the SDN controller 74, an instruction to exclude a router for which occurrence of a trouble has been confirmed from the communication route. When receiving the instruction, the SDN controller 74 may switch the communication route created by the SDN controller 74 to a communication route from which the router is excluded (that is, a communication route that does not run through the router).

The SDN controller 74 or the slice manager 92 may update the segment routing path management data shown in FIG. 8 and the router group management data shown in FIG. 9, which are stored in the inventory database 82, based on the switching of the communication routes.

There is a case in which, despite detection of no trouble in a router that is a component of the communication system 1 in the present embodiment, performance of a function element included in the communication system 1 deteriorates in a communication that uses a network slice available to the function element (so-called silent failure).

When performance of one function element deteriorates, it is surmised that, in a plurality of pairs of function elements that include the one function element, correlation between performance index values of the function elements diminishes.

In light of the above-mentioned matter, in the present embodiment, for each one of the plurality of slice communications held in the communication system 1, the number of slice communication pairs that include the slice communication and that are linked to the degrees of correlation decrease satisfying the decrease determination condition is identified as described above. At least one router included in a group of routers located on a route of a slice communication for which a slice communication pair count that satisfies the given pair count condition is identified is estimated as a router that is a cause of deterioration of performance of function elements related to the slice communication.

According to the present embodiment, a router that is a cause of a silent failure in a network slice can accurately be estimated in such a manner.

In the present embodiment, the policy manager 90 may classify the plurality of slice communications held in the communication system 1 into a plurality of slice communication groups based on a strength of correlation between performance index values which is identified for each slice communication pair.

For example, a general clustering technology may be used to classify the plurality of slice communications held in the communication system 1 into a plurality of slice communication groups. For example, the classification may be executed so that, in each one of the plurality of slice communication groups, a value of the latest degree of correlation is more than a predetermined value for every slice communication pair that has, as a component, a slice communication included in the slice communication group.

The policy manager 90 may then calculate, for each one of the plurality of slice communication groups, the degree of correlation decrease, which is linked to a pair of one slice communication which is a slice communication included in the slice communication group and another slice communication which is included in the slice communication group and which is other than the one slice communication. The degree of correlation decrease is the degree of decrease in strength of correlation between a performance index value indicating performance of a function element that holds the one slice communication in the one slice communication and a performance index value indicating performance of a function element that holds the another slice communication in the another slice communication.

The policy manager 90 may then determine, for each one of the plurality of slice communication groups and for each pair of slice communications included in the slice communication group, whether the degree of correlation decrease linked to the pair satisfies a decrease determination condition corresponding to the slice communication group.

The policy manager 90 may then determine, for each one of the plurality of slice communication groups, a threshold value corresponding to the slice communication group based on a total count of slice communications included in the slice communication group. For example, a value corresponding to 50% of the total count of slice communications, or a value corresponding to 70% of the total count of slice communications, may be determined as the threshold value.

The policy manager 90 may then estimate at least one router included in a group of routers located on a route of a slice communication for which a value indicating the identified slice communication pair count is more than the threshold value corresponding to a slice communication group that includes the slice communication pairs as a router that is a cause of deterioration of performance of function elements related to the slice communication.

As another example, the policy manager 90 may identify, for each one of slice communications included in a slice communication group, a proportion of the number of pairs that include the slice communication and that are linked to the degrees of correlation decrease satisfying the decrease determination condition to a total count of pairs that include the slice communication.

The policy manager 90 may then estimate at least one router included in a group of routers located on a route of a slice communication for which a proportion higher than a predetermined proportion is identified as a router that is a cause of deterioration of performance of function elements related to the slice communication.

In such a manner, estimation of a router that is a cause of deterioration of performance of function elements is executed on a slice communication group by slice communication group basis, by processing a relatively small number of slice communications at a time. A calculation load required to estimate a router that is a cause of deterioration of performance of function elements can accordingly be kept light.

In the present embodiment, the policy manager 90 may also calculate the degree of correlation increase, which is linked to a pair of a first slice communication held by a first function element with use of a first network slice and a second slice communication held by a second function element with use of a second network slice, out of pairs of slice communications each held by one of the plurality of function elements included in the communication system 1 with use of one of network slices. The degree of correlation increase is the degree of increase in strength of correlation between a performance index value that indicates performance of the first function element in the first slice communication and a performance index value that indicates performance of the second function element in the second slice communication. For example, the degree of correlation increase that is the degree of increase in strength of correlation between the performance index values may be calculated based on a plurality of sequentially generated pieces of correlation degree data that are linked to the same first slice communication ID and the same second slice communication ID. The degree of correlation increase may be the degree of increase in correlation coefficient of the performance index values.

The policy manager 90 may calculate a value obtained by subtracting a value of a piece of correlation degree data that is linked to the date and time data indicating the second latest date and time, out of a plurality of pieces of correlation degree data linked to a specific first slice communication ID and a specific second slice communication ID, from a value of a piece of correlation degree data that is linked to the date and time data indicating the latest date and time, as a value of the degree of correlation increase that is associated with the combination of the specific first slice communication ID and the specific second slice communication ID.

As another example, the policy manager 90 may extract, from a plurality of pieces of correlation degree data linked to a specific first slice communication ID and a specific second slice communication ID, a predetermined number of pieces of correlation degree data in reverse chronological order, starting from a piece of correlation degree data that is linked to the date and time data indicating the latest date and time. The policy manager 90 may calculate an average value and a standard deviation of values of the extracted correlation degree data. A value obtained by adding a value twice the calculated standard deviation to the calculated average value is hereinafter denoted by "v2." That is, when the calculated average value is given as "m" and the calculated standard deviation is given as "s," the value "v2" corresponds to a value "m+2s."

The policy manager 90 may subtract the value v2 from the value of the piece of correlation degree data that is linked to the date and time data indicating the latest date and time, out of the plurality of pieces of correlation degree data linked to the specific first slice communication ID and the specific second slice communication ID, to use the calculated value as a value of the degree of correlation increase that is associated with the combination of the specific first slice communication ID and the specific second slice communication ID.

Examples of the degree of correlation increase are not limited to those described above.

The policy manager 90 may generate, based on the degree of correlation increase calculated in the manner described above, correlation increase degree data having data structure an example of which is illustrated in FIG. 13.

As illustrated in FIG. 13, the correlation increase degree data may be linked to, for example, a first slice communication ID, a second slice communication ID, and date and time data.

For example, the value of the degree of correlation increase calculated in the manner described above is set to the correlation increase degree data.

For example, a first slice communication ID and a second slice communication ID that are associated with the calculated degree of correlation increase are set to the first slice communication ID and the second slice communication ID, respectively, of the correlation increase degree data.

For example, in a case of calculating the degree of correlation increase based on a plurality of pieces of correlation degree data, a date and time that represents the plurality of pieces of correlation degree data is set to the date and time data. For example, out of the plurality of pieces of correlation degree data, a piece of correlation degree data that is linked to the date and time data indicating the latest date and time may be identified to set the latest date and time as a value of the date and time data of the correlation increase degree data. As another example, out of the plurality of pieces of correlation degree data, a piece of correlation degree data that is linked to the date and time data indicating the oldest date and time may be identified to set the oldest date and time as a value of the date and time data of the correlation increase degree data.

In the present embodiment, the correlation increase degree data is generated for each slice communication pair, for example.

The policy manager 90 may acquire the degree of correlation increase, which is linked to a pair of one slice communication which is a slice communication held by one of the function elements included in the communication system 1 with the use of one of the network slices and another slice communication which is held by one of the function elements included in the communication system 1 with the use of one of the network slices and which is other than the one slice communication. The degree of correlation increase is the degree of increase in strength of correlation between a performance index value indicating performance of the function element that holds the one slice communication in the one slice communication and a performance index value indicating performance of the function element that holds the another slice communication in the another slice communication.

The policy manager 90 may then determine, for each one of the plurality of slice communication pairs, whether the degree of correlation increase that is linked to the slice communication pair satisfies the given increase determination condition.

The policy manager 90 may acquire the correlation increase degree data described above. The policy manager 90 may determine, based on the acquired correlation increase degree data, whether the value of the acquired correlation increase degree data satisfies the increase determination condition.

The policy manager 90 may acquire a plurality of pieces of latest correlation increase degree data. The policy manager 90 may determine whether a combination of values of the plurality of pieces of correlation increase degree data satisfies the increase determination condition.

It is assumed, for example, that the value of the degree of correlation increase is a value obtained by subtracting a value of a piece of correlation degree data that is linked to the date and time data indicating the second latest date and time from a value of a piece of correlation degree data that is linked to the date and time data indicating the latest date and time. In such a case, the increase determination condition may be "the value of the correlation increase degree data is equal to or more than a predetermined value." As another example, the increase determination condition may be "every one of a predetermined number (for example, three) of pieces of correlation increase degree data from a piece of correlation increase degree data that is linked to the date and time data indicating the latest date and time has a value equal to or more than a predetermined value."

It is assumed, for example, that the value of the degree of correlation increase is a value obtained by subtracting the value "v2" described above from the value of a piece of correlation degree data that is linked to the date and time data indicating the latest date and time. In such a case, the increase determination condition may be "the value of the correlation increase degree data is positive." As another example, the increase determination condition may be "every one of a predetermined number (for example, three) of pieces of correlation increase degree data from a piece of correlation increase degree data that is linked to the date and time data indicating the latest date and time has a positive value."

Figure 14:
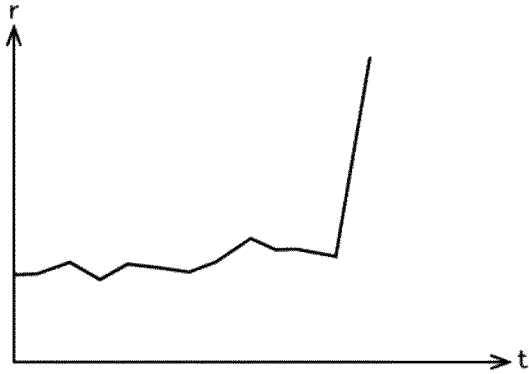
FIG. 14 is a graph for schematically showing an example of transition in the degree of correlation in a case in which the degree of correlation increase satisfies an increase determination condition.

FIG. 14 is a graph for schematically showing an example of transition in the degree of correlation in a case in which the degree of correlation increase satisfies the increase determination condition. In FIG. 14, an axis of abscissa indicates a date and time "t," which represents a period associated with the degree of correlation, and an axis of ordinate indicates a correlation degree "r."

For example, a case in which the latest degree of correlation greatly increases from the preceding degree of correlation as shown in FIG. 14 corresponds to a typical example of a case in which the degree of correlation increase satisfies the increase determination condition.

When the degree of correlation increase that is linked to a slice communication pair satisfies the increase determination condition, the policy manager 90 may identify a first router group, which is a group of routers located on a route of one slice communication included in the slice communication pair, and a second router group, which is a group of routers located on a route of another slice communication included in the slice communication pair, based on the router group data, to estimate at least one router included in both of the first router group and the second router group as a router that is a cause of deterioration of performance of function elements related to the slice communication pair.

It is assumed, for example, that it is determined that the degree of correlation increase linked to a pair of one slice communication and another slice communication satisfies the given increase determination condition. Then the policy manager 90 may identify, for example, the first router group, which is a group of routers located on a route of the one slice communication. The policy manager 90 may then identify, for example, the second router group, which is a group of routers located on a route of the another slice communication. As described above, the routes may be routes on which packets are forwarded by segment routing.

The policy manager 90 may then estimate at least one router included in both of the thus identified first router group and second router group as a router that is a cause of deterioration of performance of function elements.

It is assumed, for example, that it is determined, based on a piece of correlation increase degree data that has "gNB001," "002," "gNB002," and "001" as the linked first function element ID, first slice ID, second function element ID, and second slice ID, respectively, that a value of the degree of correlation increase indicated by the piece of correlation increase degree data satisfies the increase determination condition.

In such a case, as described above, "10000," "10001," "10002," "10011," "10012," "10021," "10022," "20001," "20002" . . . are identified as the cause candidate router ID group associated with the gNB 102a and the network slice B.

As described above, "11000," "11001," "11002," "11011," "11012," "11021," "11022," "20001," "20002" . . . are identified as the cause candidate router ID group associated with the gNB 102b and the network slice A.

Then, "20001" and "20002," which are router IDs included in every one of those two cause candidate router ID groups, may be estimated as the router IDs of routers that is a cause of the deterioration of performance of the function elements.

In such a manner, estimation of a router that is a cause of deterioration of performance of function elements is executed with the use of not only the degree of correlation decrease but also the degree of correlation increase, and a router that is a cause of silent failures can thus be estimated more accurately.

In the present embodiment, the policy manager 90 may exclude, from a router that is a cause of deterioration of performance of function elements, at least one router included in a group of routers located on a route of a slice communication for which a slice communication pair count that fails to satisfy the given pair count condition is identified.

It is assumed, for example, that the slice communication held by the gNB 102a with the use of the network slice B satisfies the pair count condition, and the slice communication held by the gNB 102c with the use of the network slice C fails to satisfy the pair count condition.

In such a case, "12000," "12001," "12002," "12011," "12012," "12021," "12022," "20001," "20003" . . . may be excluded from the router IDs of routers that are causes of deterioration of performance of the function elements. That is, in such a case, "20002" is estimated as the router ID of a router that is a cause of the deterioration of performance of the function elements.

In such a manner, a router that is a cause of a silent failure can be estimated more accurately.

The performance manager 88 may generate, by aggregating the performance index value data generated by the monitor 72, for each network slice available to a function element, overall performance index value data indicating performance of the function element in the slice communication that uses the network slice. The policy manager 90 may calculate the degree of correlation decrease and the degree of correlation increase based on the overall performance index value data generated by the performance manager 88.

In the examples described above, whether the degree of correlation decrease satisfies the decrease determination condition is determined for each pair of slice communications held by the function elements (the gNBs 102 in the examples described above) included in the RANs 32. Whether the degree of correlation increase satisfies the increase determination conditions is also determined for each pair of slice communications held by the function elements (the gNBs 102 in the example described above) included in the RANs 32. In such a case, a router that is a cause of deterioration of performance of the function elements may be estimated from groups of routers located on routes between the RANs 32 and the core network systems 34 (routes between the gNBs 102 and the UPFs 50 in the examples described above).

In the present embodiment, whether the degree of correlation decrease satisfies the decrease determination condition may be determined for each pair of slice communications held by function elements (for example, the UPFs 50) that are included in the core network systems 34. Whether the degree of correlation increase satisfies the increase determination condition may also be determined for each pair of slice communications held by the function elements (for example, the UPFs 50) that are included in the core network systems 34. A router that is a cause of deterioration of performance of the function elements may then be estimated from groups of routers located on routes between the RANs 32 and the core network systems 34. In such a case, whether the degree of correlation decrease satisfies the decrease determination condition may be determined based on, for example, performance index values related to the UPFs 50. Whether the degree of correlation increase satisfies the increase determination condition may also be determined based on the performance index values related to the UPFs 50.

The present invention is applicable also to estimation of a router that is a cause of a silent failure in a network slice in a route other than the routes between the RANs 32 and the core network systems 34.

For example, a router that is a cause of a silent failure in a network slice in one of routes (midhaul) between the CUS 44 and the DUs 42 may be estimated.

In such a case, the policy manager 90 may determine whether the degree of correlation decrease satisfies the decrease determination condition for each pair of slice communications held by the CUS 44. The policy manager 90 may also determine whether the degree of correlation increase satisfies the increase determination condition for each pair of slice communications held by the CUS 44. A router that is a cause of deterioration of performance of the CUS 44 may then be estimated from groups of routers located on routes between the CUs 44 and the DUs 42.

A value of the performance index value data may be a value indicating performance of a function element on the user plane, or a value indicating performance of a function element on the control plane.

When it is determined for a slice communication pair on the user plane that the degree of correlation decrease satisfies the decrease determination condition, or when it is determined for a slice communication pair on the user plane that the degree of correlation increase satisfies the increase determination condition, a router that is a cause of deterioration of performance of function elements may be estimated from groups of routers that are components on the user plane.

When it is determined for a slice communication pair on the control plane that the degree of correlation decrease satisfies the decrease determination condition, or when it is determined for a slice communication pair on the control plane that the degree of correlation increase satisfies the increase determination condition, that a router is a cause of deterioration of performance of function elements may be estimated from groups of routers that are components on the control plane.

Even when it is determined that the degree of correlation decrease satisfies the decrease determination condition or that the degree of correlation increase satisfies the increase determination condition with respect to a slice communication pair on the control plane, a router that is a cause of deterioration of performance of function elements may be estimated from groups of routers that are components on the control plane and groups of routers that are components on the user plane.

A router that is a cause of deterioration of performance of function elements may be estimated from groups of routers that are components of one or a plurality of network slice subnet instances out of groups of routers located on routes of slice communications. For example, a router that is a cause of deterioration of performance of function elements may be estimated from groups of routers in a backhaul part located on the routes. To give another example, a router that is a cause of deterioration of performance of function elements may be estimated from groups of routers in a midhaul part located on the routes.

Figure 15:
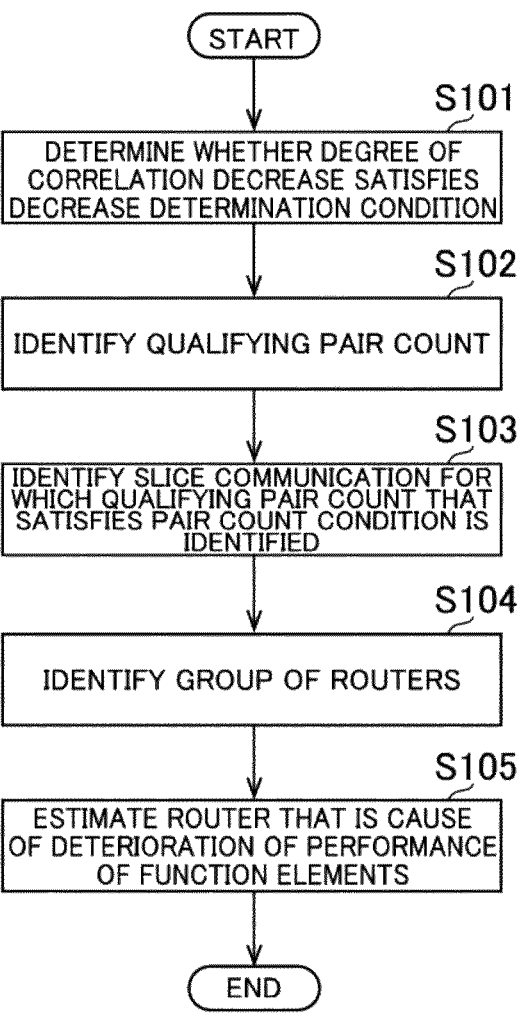
FIG. 15 is a flow chart for illustrating an example of a flow of a process performed by the platform system in the one embodiment of the present invention.

An example of a flow of a process executed in the platform system 30 in the present embodiment to estimate a router that is a cause of deterioration of performance of a function element is described with reference to a flow chart exemplified in FIG. 15.

In the following process example, it is assumed that the correlation degree data described above and the correlation decrease degree data described above are generated in advance for every slice communication pair.

First, the policy manager 90 determines, for every one of slice communication pairs, whether the degree of correlation decrease that is linked to the slice communication pair satisfies the decrease determination condition (Step S101).

The policy manager 90 identifies, for every one of slice communications, the number of slice communication pairs that include the slice communication and that are linked to the degrees of correlation decrease satisfying the decrease determination condition (the qualifying pair count) (Step S102).

The policy manager 90 identifies a slice communication for which a qualifying pair count satisfying the pair count condition has been identified in the process step of Step S102 (Step S103).

The policy manager 90 identifies a group of routers located on a route of the slice communication identified in the process step of Step S103 (Step S104).

The policy manager 90 estimates a router included in the group of routers identified in the process step of Step S104 as a router that is a cause of deterioration of performance of function elements related to the identified slice communication (Step S105), and the process illustrated in the process example is ended.

It should be noted that the present invention is not limited to the above-mentioned embodiment.

For example, the functional unit in the present embodiment is not limited to those illustrated in FIG. 3.

Further, the functional unit in the present embodiment is not required to be an NF in 5G. For example, the functional unit in the present embodiment may be an eNodeB, a vDU, a vCU, a packet data network gateway (P-GW), a serving gateway (S-GW), a mobility management entity (MME), a home subscriber server (HSS), or another network node in 4G.

Further, roles divided among the functions illustrated in FIG. 5 are not limited to those described above.

Further, the functional unit in the present embodiment may be implemented through use of a hypervisor-type or host-type virtualization technology instead of the container-type virtualization technology. Further, the functional unit in the present embodiment is not required to be implemented by software, and may be implemented by hardware, for example, by an electronic circuit. Further, the functional unit in the present embodiment may be implemented by a combination of an electronic circuit and software.

The technology described in the present disclosure can also be expressed as follows.

[1]

A router estimation system, including:

router group data storing means that stores, for each one of a plurality of network slices constructed in a communication system, router group data indicating a group of routers that form the each one of the plurality of network slices;

correlation decrease degree calculation means that calculates a degree of correlation decrease, the degree of correlation decrease being linked to a pair of one slice communication which is a slice communication held by one of function elements included in the communication system with use of one of the plurality of network slices and another slice communication which is held by one of the function elements included in the communication system with use of one of the plurality of network slices and which is other than the one slice communication, the degree of correlation decrease being a degree of decrease in strength of correlation between a performance index value that indicates performance of the one of the function elements that holds the one slice communication in the one slice communication and a performance index value that indicates performance of the one of the function elements that holds the another slice communication in the another slice communication;

decrease determination means that determines, for each of a plurality of pairs which are each the pair of the one slice communication and the another slice communication, whether the degree of correlation decrease linked to the each of the plurality of the pairs satisfies a given decrease determination condition;

pair count identification means that identifies, for each one of a plurality of slice communications held in the communication system, the number of pairs that are each the pair of the one slice communication and the another slice communication one of which is the each one of the plurality of slice communications, and that are each linked to the degree of correlation decrease satisfying the given decrease determination condition; and router estimation means that estimates at least one router as a router that is a cause of deterioration of performance of the function elements related to the each one of the plurality of slice communications, the at least one router being included in a group of routers which are identified based on the router group data and which are located on a route of the each one of the plurality of slice communications for which the number of the pairs that satisfies a given pair count condition is identified.

[2]

The router estimation system according to Item [1], wherein the router estimation means estimates at least one router included in a group of routers located on a route of the each one of the plurality of slice communications for which the number of the pairs that is greater than a predetermined count is identified as a router that is a cause of deterioration of performance of the function elements related to the each one of the plurality of slice communications.

[3]

The router estimation system according to Item [1], further including proportion identification means that identifies, for each one of the plurality of slice communications held in the communication system, a proportion of the number of pairs that are each the pair of the one slice communication and the another slice communication one of which is the each one of the plurality of slice communications, and that are each linked to the degree of correlation decrease satisfying the given decrease determination condition, to a total count of pairs that are each the pair of the one slice communication and the another slice communication one of which is the each one of the plurality of slice communications, wherein the router estimation means estimates at least one router as a router that is a cause of deterioration of performance of the function elements related to the each one of the plurality of slice communications, the at least one router being included in a group of routers located on a route of the each one of the plurality of slice communications for which the proportion higher than a predetermined proportion is identified.

[4]

The router estimation system according to Item [1], further including classification means that classifies the plurality of slice communications held in the communication system into a plurality of slice communication groups, based on the strength of the correlation identified for each pair of the plurality of slice communications, wherein the correlation decrease degree calculation means calculates the degree of correlation decrease for each one of the plurality of slice communication groups, the degree of correlation decrease being linked to a pair of one slice communication which is a slice communication included in the each one of the plurality of slice communication groups and another slice communication which is a slice communication included in the each one of the plurality of slice communication groups and which is other than the one slice communication, the degree of correlation decrease being the degree of decrease in strength of correlation between a performance index value that indicates performance of the one of the function elements that holds the one slice communication in the one slice communication and a performance index value that indicates performance of the one of the function elements that holds the another slice communication in the another slice communication, and wherein the decrease determination means determines, for each one of the plurality of slice communication groups and for each pair of slice communications included in the each one of the plurality of slice communication groups, whether the degree of correlation decrease linked to the each pair satisfies the given decrease determination condition corresponding to the each one of the plurality of slice communication groups.

[5]

The router estimation system according to Item [4], further including threshold value determination means that determines, for each one of the plurality of slice communication groups, a threshold value corresponding to the each one of the plurality of slice communication groups based on a total count of slice communications included in the each one of the plurality of slice communication groups, wherein the router estimation means estimates, when one of the plurality of slice communications has a value that indicates the identified number of pairs and that is larger than the threshold value corresponding to one of the plurality of slice communication groups including the pairs, at least one router included in a group of routers located on a route of the one of the plurality of slice communications as a router that is a cause of deterioration of performance of the function elements related to the one of the plurality of slice communications.

[6]

The router estimation system according to Item [4], further including proportion identification means that identifies, for each one of slice communications included in the each one of the plurality of slice communication groups, a proportion of the number of pairs that are each the pair of the one slice communication and the another slice communication one of which is the each one of the included slice communications, and that are each linked to the degree of correlation decrease satisfying the given decrease determination condition, to a total count of pairs that are each the pair of the one slice communication and the another slice communication one of which is the each one of the included slice communications, wherein the router estimation means estimates at least one router as a router that is a cause of deterioration of performance of the function elements related to the each one of the plurality of slice communications, the at least one router being included in a group of routers located on a route of the each one of the included slice communications for which the proportion higher than a predetermined proportion is identified.

[7]

The router estimation system according to any one of Items [1] to [6], wherein the router estimation means estimates, when a plurality of slice communications for which the number of the pairs that satisfies the given pair count condition is identified exist, at least one router included in every group of routers located on routes of the plurality of slice communications as a router that is a cause of deterioration of performance of a plurality of the function elements related to the plurality of slice communications.

[8]

The router estimation system according to any one of Items [1] to [7], further including:

correlation increase degree calculation means that calculates a degree of correlation increase, the degree of correlation increase being linked to a pair of one slice communication which is a slice communication held by one of the function elements included in the communication system with use of one of the plurality of network slices and another slice communication which is held by one of the function elements included in the communication system with use of one of the plurality of network slices and which is other than the one slice communication, the degree of correlation increase being a degree of increase in strength of correlation between a performance index value that indicates performance of the one of the function elements that holds the one slice communication in the one slice communication and a performance index value that indicates performance of the one of the function elements that holds the another slice communication in the another slice communication; and increase determination means that determines, for each of a plurality of pairs which are each the pair of the one slice communication and the another slice communication, whether the degree of correlation increase linked to the each of the plurality of pairs satisfies a given increase determination condition, wherein the router estimation means estimates, when the degree of correlation increase linked to the each of the plurality of pairs satisfies the given increase determination condition, at least one router included in both of a first router group and a second router group as a router that is a cause of deterioration of performance of the function elements related to the each of the plurality of pairs, the first router group being a group of routers that are located on a route of the one slice communication included in the each of the plurality of pairs, the second router group being a group of routers that are located on a route of the another slice communication included in the each of the plurality of pairs, the first router group and the second router group being identified based on the router group data.

[9]

The router estimation system according to Item [8], wherein the degree of correlation increase is a degree of increase in correlation coefficient of the performance index values.

[10]

The router estimation system according to any one of Items [1] to [9], wherein the router estimation means excludes, from the router that is the cause, at least one router included in a group of routers located on a route of the each one of the plurality of slice communications for which the number of the pairs that fails to satisfy the given pair count condition is identified.

[11]

The router estimation system according to any one of Items [1] to [10], wherein the one of the plurality of network slices that is used to hold the one slice communication is the same network slice as the one of the plurality of network slices that is used to hold the another slice communication.

[12]

The router estimation system according to any one of [1] to [10], wherein the one of the plurality of network slices that is used to hold the one slice communication is a network slice other than the one of the plurality of network slices that is used to hold the another slice communication.

[13]

The router estimation system according to any one of Items [1] to [12], wherein the function elements are function elements included in radio access networks of the communication system, and wherein the router estimation means estimates the router that is the cause from groups of routers located on routes between the radio access networks and core network systems of the communication system.

[14]

The router estimation system according to any one of Items [1] to [12], wherein the function elements are function elements included in core network systems of the communication system, and wherein the router estimation means estimates the router that is the cause from groups of routers located on routes between the core network systems and radio access networks of the communication system.

[15]

The router estimation system according to any one of Items [1] to [12], wherein the function elements are central units (CUs), and wherein the router estimation means estimates the router that is the cause from groups of routers located on routes between the CUS and distributed units (DUs) included in the communication system.

[16]

The router estimation system according to any one of Items [1] to [15], wherein the degree of correlation decrease is the degree of decrease in correlation coefficient of the performance index values.

[17]

The router estimation system according to any one of Items [1] to [16], wherein the route is a route on which a packet is forwarded by segment routing.

[18]

The router estimation system according to any one of Items [1] to [17], wherein the function elements are network services or network functions.

[19]

A router estimation method, including:

storing, for each one of a plurality of network slices constructed in a communication system, router group data indicating a group of routers that form the each one of the plurality of network slices;

calculating a degree of correlation decrease, the degree of correlation decrease being linked to a pair of one slice communication which is a slice communication held by one of function elements included in the communication system with use of one of the plurality of network slices and another slice communication which is held by one of the function elements included in the communication system with use of one of the plurality of network slices and which is other than the one slice communication, the degree of correlation decrease being a degree of decrease in strength of correlation between a performance index value that indicates performance of the one of the function elements that holds the one slice communication in the one slice communication and a performance index value that indicates performance of the one of the function elements that holds the another slice communication in the another slice communication;

determining, for each of a plurality of pairs which are each the pair of the one slice communication and the another slice communication, whether the degree of correlation decrease linked to the each of the plurality of the pairs satisfies a given decrease determination condition;

identifying, for each one of a plurality of slice communications held in the communication system, the number of pairs that are each the pair of the one slice communication and the another slice communication one of which is the each one of the plurality of slice communications, and that are each linked to the degree of correlation decrease satisfying the given decrease determination condition; and estimating at least one router as a router that is a cause of deterioration of performance of the function elements related to the each one of the plurality of slice communications, the at least one router being included in a group of routers which are identified based on the router group data and which are located on a route of the each one of the plurality of slice communications for which the number of the pairs that satisfies a given pair count condition is identified.

The invention claimed is:

1. A router estimation system, comprising one or more processors, the router estimation system causing at least one of the one or more processors to execute:

a router group data storing process of storing, for each one of a plurality of network slices constructed in a communication system, router group data indicating a group of routers that form the each one of the plurality of network slices;

a correlation decrease degree calculation process of calculating a degree of correlation decrease, the degree of correlation decrease being linked to a pair of one slice communication which is a slice communication held by one of function elements included in the communication system with use of one of the plurality of network slices and another slice communication which is held by one of the function elements included in the communication system with use of one of the plurality of network slices and which is other than the one slice communication, the degree of correlation decrease being a degree of decrease in strength of correlation between a performance index value that indicates performance of the one of the function elements that holds the one slice communication in the one slice communication and a performance index value that indicates performance of the one of the function elements that holds the another slice communication in the another slice communication;

a decrease determination process of determining, for each of a plurality of pairs which are each the pair of the one slice communication and the another slice communication, whether the degree of correlation decrease linked to the each of the plurality of the pairs satisfies a given decrease determination condition;

a pair count identification process of identifying, for each one of a plurality of slice communications held in the communication system, the number of pairs that are each the pair of the one slice communication and the another slice communication one of which is the each one of the plurality of slice communications, and that are each linked to the degree of correlation decrease satisfying the given decrease determination condition; and a router estimation process of estimating at least one router as a router that is a cause of deterioration of performance of the function elements related to the each one of the plurality of slice communications, the at least one router being included in a group of routers which are identified based on the router group data and which are located on a route of the each one of the plurality of slice communications for which the number of the pairs that satisfies a given pair count condition is identified.

2. The router estimation system according to claim 1, wherein, in the router estimation process, at least one router included in a group of routers located on a route of the each one of the plurality of slice communications for which the number of the pairs that is greater than a predetermined count is identified is estimated as a router that is a cause of deterioration of performance of the function elements related to the each one of the plurality of slice communications.

3. The router estimation system according to claim 1, wherein the router estimation system causes the at least one of the one or more processors to execute a proportion identification process of identifying, for each one of the plurality of slice communications held in the communication system, a proportion of the number of pairs that are each the pair of the one slice communication and the another slice communication one of which is the each one of the plurality of slice communications, and that are each linked to the degree of correlation decrease satisfying the given decrease determination condition, to a total count of pairs that are each the pair of the one slice communication and the another slice communication one of which is the each one of the plurality of slice communications, and wherein, in the router estimation process, at least one router is estimated as a router that is a cause of deterioration of performance of the function elements related to the each one of the plurality of slice communications, the at least one router being included in a group of routers located on a route of the each one of the plurality of slice communications for which the proportion higher than a predetermined proportion is identified.

4. The router estimation system according to claim 1, wherein the router estimation system causes the at least one of the one or more processors to execute a classification process of classifying the plurality of slice communications held in the communication system into a plurality of slice communication groups, based on the strength of the correlation identified for each pair of the plurality of slice communications, wherein, in the correlation decrease degree calculation process, the degree of correlation decrease is calculated for each one of the plurality of slice communication groups, the degree of correlation decrease being linked to a pair of one slice communication which is a slice communication included in the each one of the plurality of slice communication groups and another slice communication which is a slice communication included in the each one of the plurality of slice communication groups and which is other than the one slice communication, the degree of correlation decrease being the degree of decrease in strength of correlation between a performance index value that indicates performance of the one of the function elements that holds the one slice communication in the one slice communication and a performance index value that indicates performance of the one of the function elements that holds the another slice communication in the another slice communication, and wherein, in the decrease determination process, for each one of the plurality of slice communication groups and for each pair of slice communications included in the each one of the plurality of slice communication groups, whether the degree of correlation decrease linked to the each pair satisfies the given decrease determination condition corresponding to the each one of the plurality of slice communication groups is determined.

5. The router estimation system according to claim 4, wherein the router estimation system causes the at least one of the one or more processors to execute a threshold value determination process of determining, for each one of the plurality of slice communication groups, a threshold value corresponding to the each one of the plurality of slice communication groups based on a total count of slice communications included in the each one of the plurality of slice communication groups, and wherein, in the router estimation process, when one of the plurality of slice communications has a value that indicates the identified number of pairs and that is larger than the threshold value corresponding to one of the plurality of slice communication groups including the pairs, at least one router included in a group of routers located on a route of the one of the plurality of slice communications is estimated as a router that is a cause of deterioration of performance of the function elements related to the one of the plurality of slice communications.

6. The router estimation system according to claim 4, wherein the router estimation system causes the at least one of the one or more processors to execute a proportion identification process of identifying, for each one of slice communications included in the each one of the plurality of slice communication groups, a proportion of the number of pairs that are each the pair of the one slice communication and the another slice communication one of which is the each one of the included slice communications, and that are each linked to the degree of correlation decrease satisfying the given decrease determination condition, to a total count of pairs that are each the pair of the one slice communication and the another slice communication one of which is the each of the included slice communications, and wherein, in the router estimation process, at least one router is estimated as a router that is a cause of deterioration of performance of the function elements related to the each one of the plurality of slice communications, the at least one router being included in a group of routers located on a route of the each one of the included slice communications for which the proportion higher than a predetermined proportion is identified.

7. The router estimation system according to claim 1, wherein, in the router estimation process, when a plurality of slice communications for which the number of the pairs that satisfies the given pair count condition is identified exist, at least one router included in every group of routers located on routes of the plurality of slice communications is estimated as a router that is a cause of deterioration of performance of a plurality of the function elements related to the plurality of slice communications.

8. The router estimation system according to claim 1, wherein the router estimation system causes the at least one of the one or more processors to execute:

a correlation increase degree calculation process of calculating a degree of correlation increase, the degree of correlation increase being linked to a pair of one slice communication which is a slice communication held by one of the function elements included in the communication system with use of one of the plurality of network slices and another slice communication which is held by one of the function elements included in the communication system with use of one of the plurality of network slices and which is other than the one slice communication, the degree of correlation increase being a degree of increase in strength of correlation between a performance index value that indicates performance of the one of the function elements that holds the one slice communication in the one slice communication and a performance index value that indicates performance of the one of the function elements that holds the another slice communication in the another slice communication; and an increase determination process of determining, for each of a plurality of pairs which are each the pair of the one slice communication and the another slice communication, whether the degree of correlation increase linked to the each of the plurality of pairs satisfies a given increase determination condition, and wherein, in the router estimation process, when the degree of correlation increase linked to the each of the plurality of pairs satisfies the given increase determination condition, at least one router included in both of a first router group and a second router group is estimated as a router that is a cause of deterioration of performance of the function elements related to the each of the plurality of pairs, the first router group being a group of routers that are located on a route of the one slice communication included in the each of the plurality of pairs, the second router group being a group of routers that are located on a route of the another slice communication included in the each of the plurality of pairs, the first router group and the second router group being identified based on the router group data.

9. The router estimation system according to claim 8, wherein the degree of correlation increase is a degree of increase in correlation coefficient of the performance index values.

10. The router estimation system according to claim 1, wherein, in the router estimation process, at least one router included in a group of routers located on a route of the each one of the plurality of slice communications for which the number of the pairs that fails to satisfy the given pair count condition is identified is excluded from the router that is the cause.

11. The router estimation system according to claim 1, wherein the one of the plurality of network slices that is used to hold the one slice communication is the same network slice as the one of the plurality of network slices that is used to hold the another slice communication.

12. The router estimation system according to claim 1, wherein the one of the plurality of network slices that is used to hold the one slice communication is a network slice other than the one of the plurality of network slices that is used to hold the another slice communication.

13. The router estimation system according to claim 1,
wherein the function elements are function elements included in radio access networks of the communication system, and
wherein, in the router estimation process, the router that is the cause is estimated from groups of routers located on routes between the radio access networks and core network systems of the communication system.

14. The router estimation system according to claim 1,
wherein the function elements are function elements included in core network systems of the communication system, and
wherein, in the router estimation process, the router that is the cause is estimated from groups of routers located on routes between the core network systems and radio access networks of the communication system.

15. The router estimation system according to claim 1,
wherein the function elements are central units (CUs), and
wherein, in the router estimation process, the router that is the cause is estimated from groups of routers located on routes between the CUs and distributed units (DUs) included in the communication system.

16. The router estimation system according to claim 1, wherein the degree of correlation decrease is a degree of decrease in correlation coefficient of the performance index values.

17. The router estimation system according to claim 1, wherein the route is a route on which a packet is forwarded by segment routing.

18. The router estimation system according to claim 1, wherein the function elements are network services or network functions.

19. A router estimation method, comprising:
storing, for each one of a plurality of network slices constructed in a communication system, router group data indicating a group of routers that form the each one of the plurality of network slices;
calculating a degree of correlation decrease, the degree of correlation decrease being linked to a pair of one slice communication which is a slice communication held by one of function elements included in the communication system with use of one of the plurality of network slices and another slice communication which is held by one of the function elements included in the communication system with use of one of the plurality of network slices and which is other than the one slice communication, the degree of correlation decrease being a degree of decrease in strength of correlation between a performance index value that indicates performance of the one of the function elements that holds the one slice communication in the one slice communication and a performance index value that indicates performance of the one of the function elements that holds the another slice communication in the another slice communication;
determining, for each of a plurality of pairs which are each the pair of the one slice communication and the another slice communication, whether the degree of correlation decrease linked to the each of the plurality of the pairs satisfies a given decrease determination condition;
identifying, for each one of a plurality of slice communications held in the communication system, the number of pairs that are each the pair of the one slice communication and the another slice communication one of which is the each one of the plurality of slice communications, and that are each linked to the degree of correlation decrease satisfying the given decrease determination condition; and
estimating at least one router as a router that is a cause of deterioration of performance of the function elements related to the each one of the plurality of slice communications, the at least one router being included in a group of routers which are identified based on the router group data and which are located on a route of the each one of the plurality of slice communications for which the number of the pairs that satisfies a given pair count condition is identified.

* * * * *